US012072651B2

(12) United States Patent
Kabata et al.

(10) Patent No.: US 12,072,651 B2
(45) Date of Patent: Aug. 27, 2024

(54) HEATING DEVICE, FIXING DEVICE, AND IMAGE FORMING APPARATUS

(71) Applicants: Toshiyuki Kabata, Kanagawa (JP); Kota Shiodera, Tokyo (JP); Takayuki Andoh, Kanagawa (JP); Masahiro Samei, Kanagawa (JP); Hiroshi Yoshinaga, Chiba (JP)

(72) Inventors: Toshiyuki Kabata, Kanagawa (JP); Kota Shiodera, Tokyo (JP); Takayuki Andoh, Kanagawa (JP); Masahiro Samei, Kanagawa (JP); Hiroshi Yoshinaga, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/136,879

(22) Filed: Apr. 20, 2023

(65) Prior Publication Data

US 2023/0350329 A1 Nov. 2, 2023

(30) Foreign Application Priority Data

May 2, 2022 (JP) ................................ 2022-076067
Nov. 21, 2022 (JP) ................................ 2022-185661

(51) Int. Cl.
*G03G 15/20* (2006.01)

(52) U.S. Cl.
CPC ................................ *G03G 15/2053* (2013.01)

(58) Field of Classification Search
None
See application file for complete search history.

(56) References Cited

U.S. PATENT DOCUMENTS 4,977,308 A * 12/1990 Soga .................... G03G 15/206 399/331
2007/0196152 A1 8/2007 Shimizu et al.
2011/0044734 A1 2/2011 Shimokawa et al.
2011/0052245 A1 3/2011 Shinshi et al.
2011/0064437 A1 3/2011 Yamashina et al.
2011/0222875 A1 9/2011 Imada et al.
2011/0222888 A1 9/2011 Ikebuchi et al.
2011/0222931 A1 9/2011 Shinshi et al.
2011/0274453 A1 11/2011 Shimokawa et al.
(Continued)

FOREIGN PATENT DOCUMENTS

JP 1-311128 12/1989
JP 8-262903 10/1996
(Continued)

OTHER PUBLICATIONS

Extended European Search Report issued Sep. 27, 2023 in European Patent Application No. 23167715.4, 8 pages.
(Continued)

*Primary Examiner* — Sevan A Aydin
(74) *Attorney, Agent, or Firm* — XSENSUS LLP

(57) ABSTRACT

A heating device includes a rotator that rotates and a heater that heats the rotator. A rotator holder holds each lateral end of the rotator in a longitudinal direction of the rotator. The rotator holder is adhered with one of silicone oil and silicone grease, that contains siloxanes that are not smaller than a dodecamer and not greater than a heptadecamer and have a concentration not greater than 1,250 ppm.

12 Claims, 12 Drawing Sheets

(56) References Cited

U.S. PATENT DOCUMENTS

| | | | |
|---|---|---|---|
| 2012/0177388 | A1 | 7/2012 | Imada et al. |
| 2013/0045032 | A1 | 2/2013 | Shimokawa et al. |
| 2013/0164056 | A1 | 6/2013 | Imada et al. |
| 2013/0195523 | A1 | 8/2013 | Yamaji et al. |
| 2013/0209147 | A1 | 8/2013 | Ogawa et al. |
| 2014/0341627 | A1 | 11/2014 | Yoshikawa et al. |
| 2017/0185015 | A1 | 6/2017 | Yoshinaga et al. |
| 2018/0024462 | A1 | 1/2018 | Shimada et al. |
| 2018/0267449 | A1 | 9/2018 | Naitoh et al. |
| 2018/0373187 | A1 | 12/2018 | Ikebuchi et al. |
| 2020/0050144 | A1 | 2/2020 | Kabata et al. |
| 2022/0026834 | A1 | 1/2022 | Yoshinaga |

FOREIGN PATENT DOCUMENTS

| | | | | | |
|---|---|---|---|---|---|
| JP | 10-213984 | | | 8/1998 | |
| JP | 2001-249558 | | | 9/2001 | |
| JP | 2004163955 | A | * | 6/2004 | ........... G03G 9/0804 |
| JP | 2007-284701 | | | 11/2007 | |
| JP | 2010-211220 | | | 9/2010 | |
| JP | 2011-180236 | | | 9/2011 | |
| JP | 2013-164453 | | | 8/2013 | |
| JP | 2014126864 | A | * | 7/2014 | ......... G03G 15/2028 |
| JP | 2015-169810 | | | 9/2015 | |
| JP | 2015169810 | A | * | 9/2015 | |
| JP | 2019-008159 | | | 1/2019 | |
| JP | 2019-053106 | A | | 4/2019 | |
| JP | 2019053106 | A | * | 4/2019 | |

OTHER PUBLICATIONS

U.S. Appl. No. 18/160,080, filed Jan. 26, 2023, Daisuke Inoue, et al.

U.S. Appl. No. 18/179,552, filed Mar. 7, 2023, Takayuki Andoh, et al.

U.S. Appl. No. 18/176,845, filed Mar. 1, 2023, Ryohhei Sugiyama, et al.

U.S. Appl. No. 18/163,591, filed Feb. 2, 2023, Takayuki Andoh, et al.

U.S. Appl. No. 18/180,509, filed Mar. 8, 2023, Kota Shiodera, et al.

U.S. Appl. No. 18/185,778, filed Mar. 17, 2023, Masahiro Samei, et al.

U.S. Appl. No. 18/162,872, filed Feb. 1, 2023, Hiroshi Yoshinaga, et al.

Toshiyuki Kabata, et al., "Characterization of ultrafine particles emitted from color laser multiple function printers", The proceedings 211-212 (2017) of the 34th Japan Association of Aerosol Science and Technology meeting report.

* cited by examiner

HEATING DEVICE, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-076067, filed on May 2, 2022, and 2022-185661, filed on Nov. 21, 2022, in the Japan Patent Office, the entire disclosure of each of which is hereby incorporated by reference herein.

BACKGROUND

Technical Field

Embodiments of this disclosure relate to a heating device, a fixing device, and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses are installed with a heating device. As one example, the heating device is a fixing device that heats a recording medium such as a sheet to fix an unfixed image on the recording medium.

SUMMARY

This specification describes below an improved heating device. In one embodiment, the heating device includes a rotator that rotates and a heater that heats the rotator. A rotator holder holds each lateral end of the rotator in a longitudinal direction of the rotator. The rotator holder is adhered with one of silicone oil and silicone grease, that contains siloxanes that are not smaller than a dodecamer and not greater than a heptadecamer and have a concentration not greater than 1,250 ppm.

This specification further describes an improved fixing device. In one embodiment, the fixing device includes an endless belt that rotates and an opposed rotator disposed opposite an outer circumferential face of the endless belt. A heater heats the endless belt. A belt holder holds each lateral end of the endless belt in a longitudinal direction of the endless belt. The belt holder is adhered with one of silicone oil and silicone grease, that contains siloxanes that are not smaller than a dodecamer and not greater than a heptadecamer and have a concentration not greater than 1,250 ppm.

This specification further describes an improved image forming apparatus. In one embodiment, the image forming apparatus includes an image forming device that forms an image and a heating device that heats the image on a recording medium. The heating device includes a rotator that rotates and a heater that heats the rotator. A rotator holder holds each lateral end of the rotator in a longitudinal direction of the rotator. The rotator holder is adhered with one of silicone oil and silicone grease, that contains siloxanes that are not smaller than a dodecamer and not greater than a heptadecamer and have a concentration not greater than 1,250 ppm.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
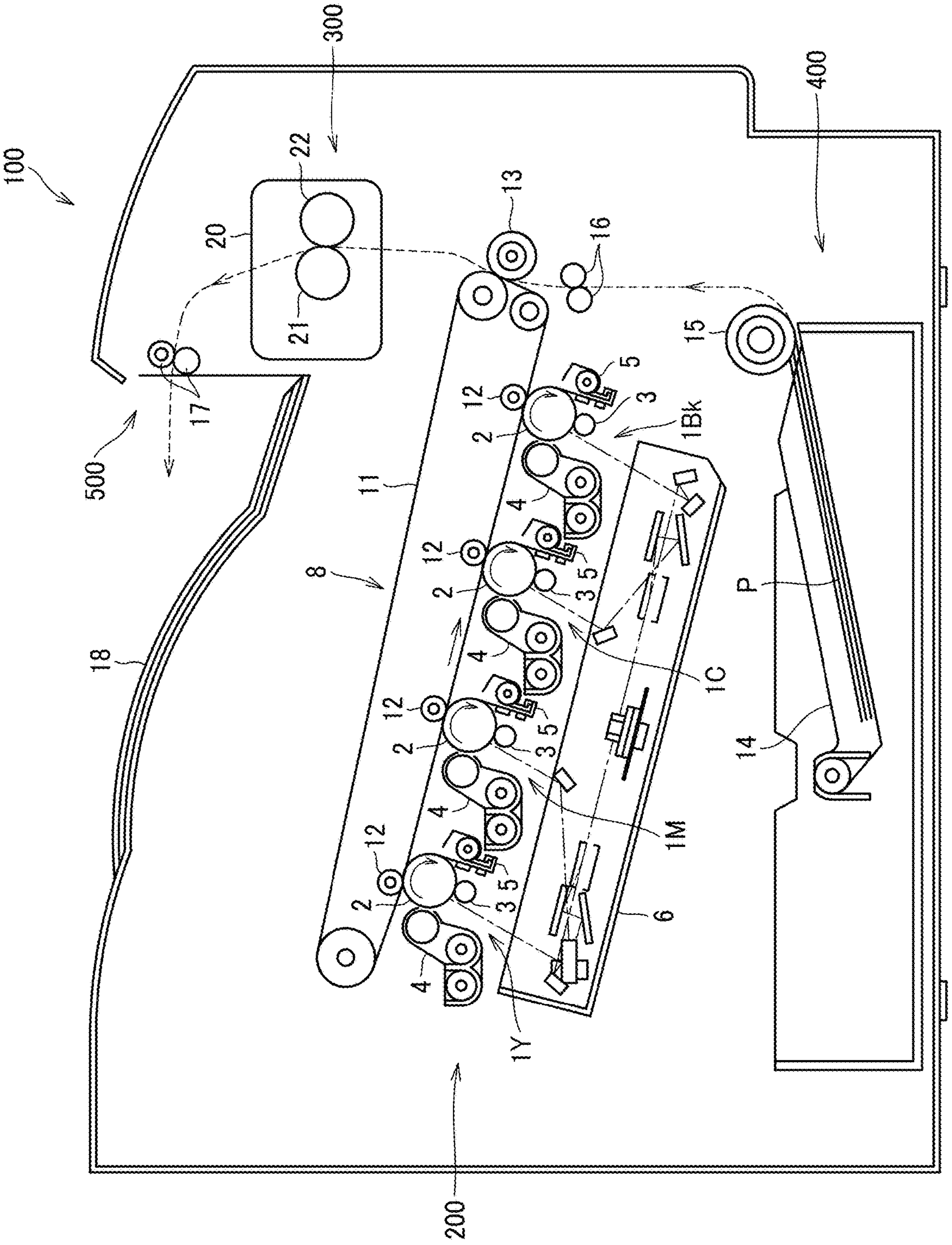
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

FIG. 1 is a schematic cross-sectional view of an image forming apparatus 100 according to an embodiment of the present disclosure. The image forming apparatus 100 is a printer. Alternatively, the image forming apparatus 100 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of an overall construction and operation of the image forming apparatus 100 according to an embodiment of the present disclosure.

As illustrated in FIG. 1, the image forming apparatus 100 according to the embodiment includes an image forming portion 200, a fixing portion 300, a recording medium supply portion 400, and a recording medium ejecting portion 500. The image forming portion 200 forms a toner image on a sheet P serving as a recording medium. The fixing portion 300 fixes the toner image on the sheet P. The recording medium supply portion 400 supplies the sheet P to the image forming portion 200. The recording medium ejecting portion 500 ejects the sheet P onto an outside of the image forming apparatus 100.

The image forming portion 200 includes four process units 1Y, 1M, 1C, and 1Bk, an exposure device 6, and a transfer device 8. The process units 1Y, 1M, 1C, and 1Bk serve as image forming units or image forming devices, respectively. The exposure device 6 forms an electrostatic latent image on a photoconductor 2 of each of the process units 1Y, 1M, 1C, and 1Bk. The transfer device 8 transfers the toner image onto the sheet P.

The process units 1Y, 1M, 1C, and 1Bk basically have similar constructions, respectively. However, the process units 1Y, 1M, 1C, and 1Bk contain toners, serving as developers, in different colors, that is, yellow, magenta, cyan, and black, respectively, which correspond to color separation components for a color image. For example, each of the process units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer device 8 includes an intermediate transfer belt 11, primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 are pressed against the photoconductors 2, respectively, via the intermediate transfer belt 11, thus forming primary transfer nips between the intermediate transfer belt 11 and the photoconductors 2. The secondary transfer roller 13 contacts an outer circumferential surface of the intermediate transfer belt 11 to form a secondary transfer nip therebetween.

The fixing portion 300 includes a fixing device 20 serving as a heating device that heats the sheet P transferred with the toner image. The fixing device 20 includes a fixing belt 21 and a pressure roller 22. The fixing belt 21 heats the toner image on the sheet P. The pressure roller 22 contacts the fixing belt 21 to form a nip (e.g., a fixing nip) therebetween.

The recording medium supply portion 400 includes a sheet tray 14 (e.g., a paper tray) and a feed roller 15. The sheet tray 14 loads a plurality of sheets P serving as recording media. The feed roller 15 picks up and feeds a sheet P from the sheet tray 14. According to the embodiments below, a sheet (e.g., a sheet P) is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

The recording medium ejecting portion 500 includes an output roller pair 17 and an output tray 18. The output roller pair 17 ejects the sheet P onto the outside of the image forming apparatus 100. The output tray 18 is placed with the sheet P ejected by the output roller pair 17. The image forming apparatus 100 further includes a timing roller pair 16.

Referring to FIG. 1, a description is provided of printing processes performed by the image forming apparatus 100 according to the embodiment.

When the image forming apparatus 100 receives an instruction to start printing, a driver starts driving and rotating the photoconductor 2 of each of the process units 1Y, 1M, 1C, and 1Bk clockwise in FIG. 1 and the intermediate transfer belt 11 of the transfer device 8 counterclockwise in FIG. 1. The feed roller 15 starts rotation, feeding a sheet P from the sheet tray 14. As the sheet P fed by the feed roller 15 comes into contact with the timing roller pair 16, the timing roller pair 16 temporarily halts the sheet P. Thus, the timing roller pair 16 temporarily interrupts conveyance of the sheet P until the toner image, that is to be transferred onto the sheet P, is formed on the intermediate transfer belt 11.

The charger 3 of each of the process units 1Y, 1M, 1C, and 1Bk charges the surface of the photoconductor 2 evenly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the process units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11. Thus, the superimposed toner images form a full color toner image on the intermediate transfer belt 11. Alternatively, one of the four process units 1Y, 1M, 1C, and 1Bk may be used to form a monochrome toner image or two or three of the four process units 1Y, 1M, 1C, and 1Bk may be used to form a bicolor toner image or a tricolor toner image. After the toner image formed on the photoconductor 2 is transferred onto the intermediate transfer belt 11, the cleaner 5 removes residual toner and the like remaining on the photoconductor 2 therefrom.

The full color toner image formed on the intermediate transfer belt 11 is conveyed to the secondary transfer nip defined by the secondary transfer roller 13 in accordance with rotation of the intermediate transfer belt 11 and is transferred onto the sheet P conveyed by the timing roller pair 16. Thereafter, the sheet P transferred with the full color toner image is conveyed to the fixing device 20 where the fixing belt 21 and the pressure roller 22 fix the full color toner image on the sheet P under heat and pressure. The sheet P is conveyed to the recording medium ejecting portion 500 where the output roller pair 17 ejects the sheet P onto the output tray 18. Thus, a series of printing processes is finished.

Figure 2:
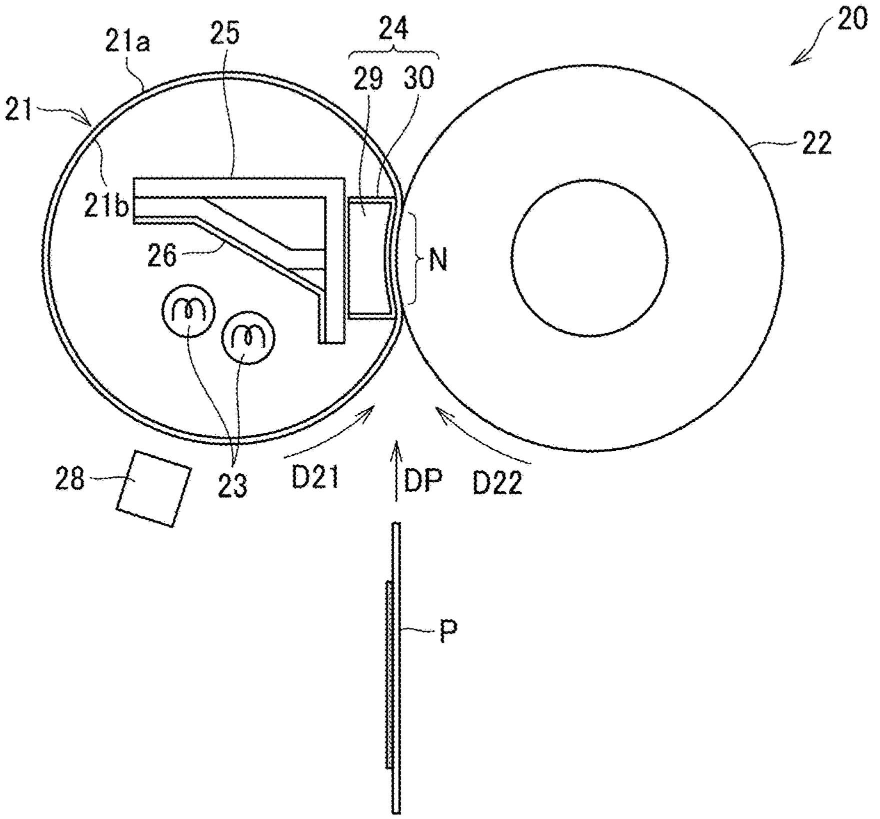
FIG. 2 is a cross-sectional view of a fixing device incorporated in the image forming apparatus depicted in FIG. 1, illustrating a cross section at a center of the fixing device in a longitudinal direction thereof.
Figure 3:
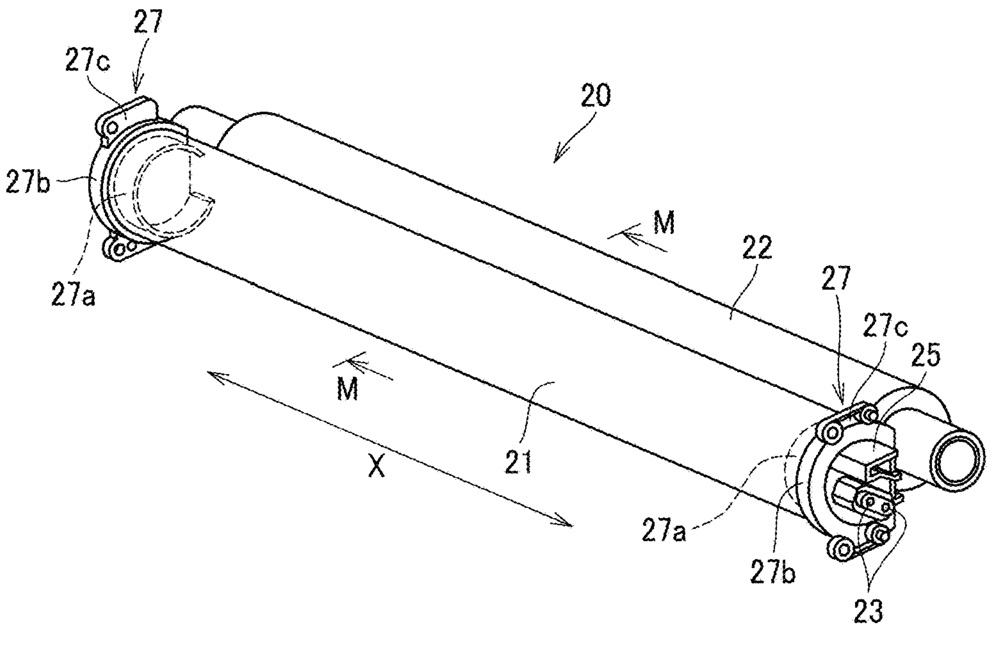
FIG. 3 is a perspective view of the fixing device depicted in FIG. 2.

Referring to FIGS. 2 and 3, a description is provided of a basic construction of the fixing device 20 according to an embodiment of the present disclosure.

FIG. 2 is a cross-sectional view of the fixing device 20 according to the embodiment, taken on a center M depicted in FIG. 3 of the fixing belt 21 in a longitudinal direction thereof. The longitudinal direction of the fixing belt 21 denotes a longitudinal direction X illustrated in FIG. 3 and is parallel to an axial direction of the pressure roller 22 or a width direction of the sheet P passing through a fixing nip N formed between the fixing belt 21 and the pressure roller 22. The width direction of the sheet P is perpendicular to a sheet conveyance direction DP in which the sheet P is conveyed. A longitudinal direction described below is also defined as described above.

As illustrated in FIGS. 2 and 3, in addition to the fixing belt 21 and the pressure roller 22, the fixing device 20 according to the embodiment includes heaters 23, a nip formation pad 24, a stay 25, a reflector 26 depicted in FIG. 2, belt holders 27 depicted in FIG. 3, and a temperature sensor 28 depicted in FIG. 2.

The fixing belt 21 serves as a rotator (e.g., a first rotator or a fixing rotator) or an endless belt that contacts an unfixed toner image bearing side of a sheet P, which bears an unfixed toner image, and fixes the unfixed toner image (e.g., unfixed toner) on the sheet P. The fixing belt 21 rotates in a rotation direction D21.

For example, the fixing belt 21 is an endless belt that includes a base layer serving as an inner circumferential surface layer, an elastic layer disposed on the base layer, and a release layer disposed on the elastic layer and serving as an outer circumferential surface layer. The base layer has a layer thickness in a range of from 30 μm to 50 μm and is made of a metal material such as nickel and stainless steel or a resin material such as polyimide. The elastic layer has a layer thickness in a range of from 100 μm to 300 μm and is made of a rubber material such as silicone rubber, silicone rubber foam, and fluororubber. Since the fixing belt 21 incorporates the elastic layer, the elastic layer prevents slight surface asperities from being produced on a surface of the fixing belt 21 at the fixing nip N. Accordingly, heat is quickly conducted from the fixing belt 21 to the toner image on the sheet P evenly. The release layer has a layer thickness in a range of from 10 μm to 50 μm. The release layer is made of perfluoroalkoxy alkane (PFA), polytetrafluoroethylene (PTFE), polyimide, polyether imide, polyether sulfone (PES), or the like. As the fixing belt 21 incorporates the release layer, the release layer facilitates separation and peeling of toner of the toner image formed on the sheet P from the fixing belt 21. In order to decrease the size and the thermal capacity of the fixing belt 21, the fixing belt 21 preferably has a total thickness not greater than 1 mm and a diameter not greater than 30 mm.

The pressure roller 22 serves as a rotator (e.g., a second rotator or an opposed rotator) that is disposed opposite an outer circumferential face 21*a* of the fixing belt 21. The pressure roller 22 rotates in a rotation direction D22.

For example, the pressure roller 22 includes a core metal that is solid and made of iron, an elastic layer that is disposed on an outer circumferential face of the core metal, and a release layer that is disposed on an outer circumferential face of the elastic layer. Alternatively, the core metal may be hollow. The elastic layer is made of silicone rubber, silicone rubber foam, fluororubber, or the like. The release layer is made of fluororesin such as PFA and PTFE.

Each of the heaters 23 serves as a heat source that heats the fixing belt 21. According to the embodiment, a halogen heater is used as each of the heaters 23. Alternatively, instead of the halogen heater, each of the heaters 23 may be other heater employing a radiant heating system, such as a carbon heater and a ceramic heater, or a heat source employing an electromagnetic induction heating system. According to the embodiment, the two heaters 23 are disposed within a loop formed by the fixing belt 21. Alternatively, the fixing device 20 may incorporate a single heater 23 or three or more heaters 23.

The nip formation pad 24 is disposed within the loop formed by the fixing belt 21. The nip formation pad 24 is disposed opposite the pressure roller 22 via the fixing belt 21, forming the fixing nip N between the fixing belt 21 and the pressure roller 22. The nip formation pad 24 includes a base pad 29 and a slide sheet 30.

The base pad 29 extends continuously in the longitudinal direction X of the fixing belt 21 and is secured to the stay 25. The base pad 29 receives pressure from the pressure roller 22, defining a shape of the fixing nip N. The base pad 29 is preferably made of a heat-resistant material that has a heat-resistant temperature of 200 degrees Celsius or higher. For example, the base pad 29 is made of general heat-resistant resin such as polyether sulfone (PES), polyphenylene sulfide (PPS), liquid crystal polymer (LCP), polyether nitrile (PEN), polyamide imide (PAI), and polyether ether ketone (PEEK). As the base pad 29 is made of the heat-resistant material described above, the base pad 29 is immune from thermal deformation in a fixing temperature range, stabilizing the shape of the fixing nip N. As illustrated in FIG. 2, the fixing nip N is recessed or curved. Alternatively, the fixing nip N may be planar or may have other shapes.

The slide sheet 30 is interposed between the base pad 29 and an inner circumferential face 21*b* of the fixing belt 21 and is made of a low friction material. Since the slide sheet 30 is interposed between the base pad 29 and the fixing belt 21, the slide sheet 30 decreases sliding friction with which the fixing belt 21 slides over the base pad 29 via the slide sheet 30. If the base pad 29 is made of the low friction material, the nip formation pad 24 may not incorporate the slide sheet 30.

The stay 25 serves as a support that contacts a stay opposed face of the nip formation pad 24, that is opposite to a pressure roller opposed face of the nip formation pad 24, that is disposed opposite the pressure roller 22, thus supporting the nip formation pad 24. As the stay 25 supports the nip formation pad 24, the stay 25 suppresses a bend of the nip formation pad 24 by pressure from the pressure roller 22. For example, the stay 25 suppresses a bend of the nip formation pad 24 throughout an entire span of the nip formation pad 24 in the longitudinal direction X of the fixing belt 21. Thus, the stay 25 causes the nip formation pad 24 to form the fixing nip N that has an even length in the sheet conveyance direction DP throughout an entire span of the fixing belt 21 in the longitudinal direction X thereof. The stay 25 is preferably made of a ferrous metal material such as stainless used steel (SUS) and steel electrolytic cold commercial (SECC) to achieve rigidity.

The reflector 26 reflects radiant heat (e.g., infrared light) radiated from the heaters 23. The reflector 26 reflects radiant heat emitted by the heaters 23 toward the fixing belt 21, facilitating heating of the fixing belt 21. The reflector 26 is interposed between the stay 25 and the heaters 23, thus also suppressing conduction of heat to the stay 25. Accordingly, the reflector 26 suppresses conduction of heat to an element that does not directly contribute to fixing of the toner image on the sheet P, saving energy. The reflector 26 is made of a metal material such as aluminum and stainless steel. For example, if the reflector 26 is constructed of a base layer made of aluminum and coated with silver having an enhanced reflectance by vapor deposition, the reflector 26 improves efficiency in heating the fixing belt 21 further.

The belt holders 27 serve as a pair of rotator holders that rotatably holds or supports the fixing belt 21. As illustrated in FIG. 3, the belt holders 27 are inserted into an interior within the loop formed by the fixing belt 21 at both lateral ends of the fixing belt 21 in the longitudinal direction X thereof, respectively. The belt holders 27 contact the inner circumferential face 21*b* of the fixing belt 21, rotatably holding or supporting the fixing belt 21. In the present disclosure, both lateral ends and a lateral end of the fixing belt 21 in the longitudinal direction X thereof are not limited to both outermost lateral edges and an outermost lateral edge of the fixing belt 21 in the longitudinal direction X thereof, respectively. In addition to both outermost lateral edges and the outermost lateral edge of the fixing belt 21 in the longitudinal direction X thereof, both lateral ends and the lateral end of the fixing belt 21 in the longitudinal direction X thereof also denote an arbitrary position within a span having a length from a lateral edge to a divided position on the fixing belt 21 in the longitudinal direction X thereof when the fixing belt 21 is divided into three equal parts in the longitudinal direction X thereof. Accordingly, the belt holder 27 holds or supports a region (e.g., the lateral end of the fixing belt 21) encompassing the outermost lateral edge of the fixing belt 21 in the longitudinal direction X thereof. Additionally, the belt holder 27 may hold or support a region (e.g., the lateral end of the fixing belt 21) not encompassing the lateral edge of the fixing belt 21 in the longitudinal direction X thereof.

For example, the belt holder 27 includes an insertion portion 27*a*, a restricting portion 27*b*, and a secured portion 27*c*. The insertion portion 27*a* is C-shaped in cross section and is inserted into the interior within the loop formed by the fixing belt 21 at the lateral end of the fixing belt 21 in the longitudinal direction X thereof. The restricting portion 27*b* has an outer diameter that is greater than an outer diameter of the insertion portion 27*a*. The secured portion 27*c* is secured to a side plate of the fixing device 20 described below. The restricting portion 27*b* has an outer diameter that is greater than at least an outer diameter of the fixing belt 21. If the fixing belt 21 is skewed or moved in the longitudinal direction X thereof, the restricting portion 27*b* restricts skew or motion of the fixing belt 21. As the insertion portion 27*a* is inserted into the interior within the loop formed by the fixing belt 21 at the lateral end of the fixing belt 21 in the longitudinal direction X thereof, the insertion portion 27*a* contacts the inner circumferential face 21*b* of the fixing belt 21, thus rotatably holding or supporting the fixing belt 21.

The belt holder 27 is made of a resin material called super engineering plastic such as polyphenylene sulfide, polyether ether ketone, polyarylate, liquid crystal polymer, polyimide, polybenzimidazole, and polybutylene naphthalate. In view of machining and heat resistance, liquid crystal polymer is preferable. If the belt holder 27 is made of the super engineering plastic mixed with glass fiber, the belt holder 27 is preferably immune from deformation caused by temperature change.

The temperature sensor 28 serves as a temperature detector that detects a temperature of the fixing belt 21. According to the embodiment, the temperature sensor 28 is anon-contact type temperature sensor that does not contact the outer circumferential face 21*a* of the fixing belt 21. In this case, the temperature sensor 28 detects an ambient temperature at a position in proximity to the outer circumferential face 21*a* of the fixing belt 21 as a surface temperature of the fixing belt 21. Alternatively, instead of the non-contact type temperature sensor, the temperature sensor 28 may be a contact type temperature sensor that contacts the fixing belt 21 and detects the surface temperature of the fixing belt 21. For example, general temperature sensors such as a thermopile, a thermostat, a thermistor, and a normally closed (NC) sensor are used as the temperature sensor 28.

A description is provided of operation of the fixing device 20 according to the embodiment.

As a driver disposed inside an apparatus body of the image forming apparatus 100 drives and rotates the pressure roller 22 in the rotation direction D22 depicted in FIG. 2, the pressure roller 22 drives and rotates the fixing belt 21 in the rotation direction D21. As the heaters 23 generate heat, the heaters 23 heat the fixing belt 21. For example, a controller controls a heat generation amount of the heaters 23 based on a temperature of the fixing belt 21, that is detected by the temperature sensor 28, thus retaining a predetermined fixing temperature of the fixing belt 21 at which the fixing belt 21 fixes the toner image on the sheet P. In a state in which the fixing belt 21 has the predetermined fixing temperature, as a sheet P bearing an unfixed toner image is conveyed through the fixing nip N formed between the fixing belt 21 and the pressure roller 22, the fixing belt 21 and the pressure roller 22 fix the unfixed toner image on the sheet P under heat and pressure.

A description is provided of a construction of a first comparative fixing device.

The first comparative fixing device includes a rotator such as a belt and a slide aid such as a nip formation pad and a belt holder. The rotator slides over the slide aid relatively. See Japanese Unexamined Patent Application Publication No. 2013-164453, for example. In order to decrease sliding friction between the slide aid and the rotator, the first comparative fixing device generally uses a substance having lubricity such as oil and grease (hereinafter referred to as a lubricant). The substance having lubricity denotes a substance that is interposed between parts and decreases frictional resistance between the parts.

Environmental awareness increases in overseas countries, especially in Europe. Image forming apparatuses using electrophotography, such as copiers, multifunction peripherals, and printers, are also applied with various accreditation criteria for volatile organic compounds (VOC), ozone, dust, and fine particles, that generate during image formation. For example, a research institute of the German government authorizes an ecolabel called the Blue Angel mark. Usage of the ecolabel is permitted to products and services that are accredited.

Sales is not prohibited for products that are not accredited with the Blue Angel mark. However, the products that are not accredited with the Blue Angel mark are often regarded as being not environmentally friendly, especially in government offices. Hence, whether or not the products are accredited with the Blue Angel mark may affect sales of the products substantially.

In order to obtain accreditation of the Blue Angel mark, the products are requested to pass various examinations. Examinations for ultrafine particles are very difficult to pass. For example, a number of the ultrafine particles that have a size in a range of from 5.6 nm to 560 nm and generate from an image forming apparatus is measured with a particle measurement device, that is, a fast mobility particle sizer (FMPS), and is requested to be smaller than $3.5\times10^{11}$ pieces per 10 minutes. More strict criteria are expected in the future. The number of the ultrafine particles is not classified by a type and a status of a substance of an ultrafine particle. For example, the number of the ultrafine particles is not classified by whether the ultrafine particles are organic or inorganic and whether the ultrafine particles are solid or liquid (e.g., mist). The size and the number of the ultrafine particles are concerned.

The image forming apparatus includes various elements that generate the ultrafine particles. However, as the first comparative fixing device of the image forming apparatus starts, a generation amount of the ultrafine particles increases substantially. Hence, the first comparative fixing device is regarded as a main source of the ultrafine particles. As the lubricant described above is heated to a high temperature, the ultrafine particles are detected. Hence, the lubricant is one of sources of the ultrafine particles. As the lubricant is heated to the high temperature, a very small part of components of the lubricant is volatilized as hot gas. Thereafter, the gas is cooled and is subject to condensation into the ultrafine particles. Accordingly, the lubricant is requested not to be exposed in a hot environment so as to suppress generation of the ultrafine particles from the image forming apparatus.

A description is provided of a construction of a second comparative fixing device disclosed by Japanese Unexamined Patent Application Publication No. H8-262903.

The second comparative fixing device includes a heating-fixing roll, an endless belt, and a pressure pad. The heating-fixing roll (e.g., a pressure roller) is rotatable. The endless belt (e.g., a fixing belt) contacts the heating-fixing roll. The pressure pad (e.g., a nip formation pad) presses against the heating-fixing roll via the endless belt. The pressure pad is disposed within a loop formed by the endless belt such that the pressure pad does not rotate. The pressure pad presses the endless belt against the heating-fixing roll. Accordingly, a surface of the heating-fixing roll is deformed elastically, forming a belt nip between the endless belt and the heating-fixing roll. A recording sheet (e.g., a recording medium or a recording material that bears a toner image) is conveyed through the belt nip. The second comparative fixing device having the construction described above decreases heat loss at the belt nip. Additionally, the second comparative fixing device prevents a difference between a conveyance speed at which the recording sheet is conveyed and a rotation speed at which the heating-fixing roll rotates and prevents air or vapor within the belt nip from degrading a toner image formed on the recording sheet.

However, if a coefficient of friction between an inner circumferential face of the endless belt and the pressure pad (e.g., the nip formation pad) increases, a driving torque of the heating-fixing roll increases. Accordingly, stress applied on a gear bearing may increase, causing breakage of a gear and a core. If friction between the endless belt and the pressure pad becomes too great to ignore, compared to a driving force with which the heating-fixing roll drives and rotates the endless belt, slippage may generate between the heating-fixing roll and the endless belt, shifting an unfixed toner image on a recording sheet.

A description is provided of a construction of a third comparative fixing device disclosed by Japanese Unexamined Patent Application Publication No. H10-213984 that overcomes the disadvantages described above.

The third comparative fixing device includes a pressure pad (e.g., a pressing pad), an endless belt, and a heating-fixing roll. Modified silicone oil as a lubricant is interposed between the pressure pad and the endless belt. Accordingly, the third comparative fixing device attains stable motion (e.g., rotation) of the endless belt without degrading separation of a recording sheet from the heating-fixing roll.

The third comparative fixing device disclosed by Japanese Unexamined Patent Application Publication No. H10-213984 includes a low-friction sheet that covers a surface of the pressure pad so that the endless belt slides over the pressure pad via the low-friction sheet that has a decreased coefficient of friction. However, the third comparative fixing device does not consider surface wettability of the modified silicone oil that is applied on the low-friction sheet or the endless belt. Accordingly, the third comparative fixing device may not retain the modified silicone oil stably, rendering maintenance to be difficult.

A description is provided of a construction of a fourth comparative fixing device disclosed by Japanese Unexamined Patent Application Publication No. 2010-211220 that overcomes the disadvantages described above.

The fourth comparative fixing device includes a base, a non-porous sheet, a pressure pad, and an endless belt. The base is uneven. The non-porous sheet is mounted on the base and is made of heat-resistant resin contained in at least a slide face. The non-porous sheet serves as a sheet slide aid that is interposed between the pressure pad (e.g., a nip formation pad) and the endless belt (e.g., a tubular resin film).

A description is provided of a construction of a fifth comparative fixing device disclosed by Japanese Unexamined Patent Application Publication No. 2001-249558.

The fifth comparative fixing device includes a tubular film and a pressure pad (e.g., a nip formation pad) that has a slide contact face over which the tubular film slides. The slide contact face is applied with lipophilic fluororesin or applied with a lipophilic agent and fluororesin. Accordingly, the fifth comparative fixing device improves wettability with respect to a lubricant, suppressing drying up of oil. Accordingly, the fifth comparative fixing device attains stable sliding of the tubular film over the pressure pad, retaining improved quality of a toner image fixed on a sheet and an improved fixing property.

In a fixing device, for example, the first comparative fixing device, the second comparative fixing device, the third comparative fixing device, the fourth comparative fixing device, and the fifth comparative fixing device described above, a lubricant such as silicone oil is interposed between a slide contact face of a nip formation pad (e.g., a pressure pad) and an inner circumferential face of a fixing belt (e.g., an endless belt), improving efficiency in energy consumption and saving energy. Hence, the fixing device is installed in image forming apparatuses.

The image forming apparatus includes various elements that generate the ultrafine particles. As the fixing device of the image forming apparatus is driven, a generation amount of the ultrafine particles increases substantially. Hence, the fixing device is regarded as a main source of the ultrafine particles. When an image having a decreased image area is printed, a generation amount of the ultrafine particles decreases. Hence, toner is related to generation of the ultrafine particles.

The ultrafine particles described in the present disclosure also denote fine particles (FP) and ultrafine particles (UFP) measured under measurement conditions used to examine a relation illustrated in FIG. 5 as described below. Hence, the ultrafine particle denotes a particle having a particle diameter in a range of from 5.6 nm to 560 nm.

Components of an ultrafine particle are analyzed in detail. The proceedings 211-212 (2017) of the 34th Japan Association of Aerosol Science and Technology meeting report that the components of the ultrafine particle include cyclic siloxanes that are not smaller than a dodecamer (D12) and are not greater than a heptadecamer (D17) in addition to paraffin and higher alcohol contained in toner.

The cyclic siloxanes from the dodecamer to the heptadecamer are usually contained in silicone rubber or silicone oil, as impurities.

A description is provided of a construction of a sixth comparative fixing device disclosed by Japanese Patent No. 4985803.

The sixth comparative fixing device includes a roller made of silicone rubber that generates siloxanes as the ultrafine particles. However, a source that generates a substantial amount of the cyclic siloxanes from the dodecamer to the heptadecamer is not disclosed.

As the fixing belt is heated to a higher temperature, an amount of the ultrafine particles generated from the fixing device is subject to increase. To address increase in the amount of the ultrafine particles caused by temperature increase of the fixing belt, low melting toner is used. The low melting toner allows a preset low temperature of the fixing belt for fixing, thus suppressing generation of the ultrafine particles. Under a condition in which the fixing belt has the preset low temperature, as silicone oil interposed between the nip formation pad and the fixing belt, silicone oil that is not removed of low molecular siloxanes and is available at a low cost is employed.

However, as the fixing belt rotates at an increased speed to address a request for increasing a print speed, although a surface temperature of the fixing belt is unchanged, the ultrafine particles generate. As the fixing belt rotates at the increased speed, in order to retain a constant temperature of the fixing belt, a heater that heats the fixing belt conceivably increases output. For example, as the heater, that increases output, heats silicone oil applied on an inner circumferential face of the fixing belt directly, the silicone oil is subject to temperature increase. Accordingly, the silicone oil conceivably generates the ultrafine particles.

A description is provided of a construction of a seventh comparative fixing device disclosed by Japanese Patent No. 6213313.

The seventh comparative fixing device includes a fixing belt and a nip formation pad. In order to suppress generation of the ultrafine particles from the silicone oil applied on an inner circumferential face of the fixing belt, the silicone oil is interposed between an outer slide contact face of the nip formation pad and the inner circumferential face of the fixing belt (e.g., an endless belt), that contacts and slides over the outer slide contact face of the nip formation pad. The silicone oil contains siloxanes from an undecamer to a heptadecamer in an amount of 2,000 ppm or smaller.

For example, in the seventh comparative fixing device disclosed by Japanese Patent No. 6213313, the silicone oil interposed between the nip formation pad and the fixing belt conceivably generates the ultrafine particles. Therefore, in order to verify that most of the ultrafine particles generated from the fixing device generated from the silicone oil interposed between the fixing belt and the nip formation pad, the silicone oil containing a decreased amount of the siloxanes from the undecamer to the heptadecamer was applied between the fixing belt and the nip formation pad and a toner image was fixed on a sheet. However, generation of the ultrafine particles was not suppressed effectively.

A description is provided of a construction of an eighth comparative fixing device disclosed by Japanese Patent No. 5153251.

The eighth comparative fixing device includes a fixing belt and a nip formation pad. Silicone oil containing an extremely small amount of cyclic siloxanes from a trimer to an icosamer was applied between the fixing belt and the nip formation pad. Similarly, generation of the ultrafine particles was not suppressed effectively.

Verification was performed in detail to identify a source in the fixing device, that generated a substantial amount of the ultrafine particles. The substantial amount of the ultrafine particles generated at a position in proximity to a lateral end of the fixing belt in a longitudinal direction thereof. In an early stage of verification, silicone oil interposed between the fixing belt and the nip formation pad conceivably generated the ultrafine particles. During the verification to identify the source of the ultrafine particles, silicone oil interposed between an outer circumferential face of a belt holder and an inner circumferential face of the fixing belt was not considered. For example, an amount of the silicone oil adhered to the belt holder was overwhelmingly smaller than an amount of the silicone oil interposed between the fixing belt and the nip formation pad. Additionally, the belt holder was separated from a heater that heated the fixing belt. Hence, in the early stage of verification, the silicone oil applied on the belt holder barely concerned generation of the ultrafine particles conceivably.

However, when the silicone oil adhered to the belt holder was removed and a blank sheet bearing no toner was conveyed over the fixing belt, a generation amount of the ultrafine particles decreased substantially. Accordingly, the silicone oil interposed between the belt holder and the fixing belt was identified as a main source of the fixing device, that generated the ultrafine particles.

In order to suppress generation of the ultrafine particles effectively, the lubricant such as the silicone oil is not advantageously interposed between the belt holder and the fixing belt. However, in this case, the fixing belt may not slide over the belt holder smoothly. Additionally, the lateral end of the fixing belt in the longitudinal direction thereof may be damaged, resulting in a shortened product life of the fixing device. For example, if the belt holder is made of a material containing glass fiber, the glass fiber exposed from a surface of the belt holder may damage the inner circumferential face of the fixing belt. Hence, in order to suppress damage to the inner circumferential face of the fixing belt, the lubricant such as the silicone oil is preferably interposed between the outer circumferential face of the belt holder and the inner circumferential face of the fixing belt.

To address the circumstances described above, according to embodiments of the present disclosure, in which a lubricant is interposed between a rotator such as a fixing belt and a rotator holder that holds the rotator, generation of the ultrafine particles from the lubricant is suppressed.

A description is provided of a method for suppressing generation of the ultrafine particles according to the embodiments of the present disclosure.

As described above, in the fixing device 20 according to the embodiment illustrated in FIGS. 1 to 3, as the fixing belt 21 rotates, the fixing belt 21 slides over the nip formation pad 24 disposed within the loop formed by the fixing belt 21. The lubricant is applied between the fixing belt 21 and the nip formation pad 24. The lubricant decreases sliding friction that generates between the fixing belt 21 and the nip formation pad 24, retaining smooth rotation of the fixing belt 21 and suppressing abrasion of the fixing belt 21. Silicone oil, silicone grease, fluorine grease, fluorine oil, or the like is generally used as the lubricant. The lubricant is impregnated into the slide sheet 30 depicted in FIG. 2 interposed between the base pad 29 of the nip formation pad 24 and the inner circumferential face 21*b* of the fixing belt 21. As the lubricant seeps out of the slide sheet 30, the lubricant is interposed between the nip formation pad 24 and the fixing belt 21.

The fixing device 20 according to the embodiment incorporates the pair of belt holders 27 that rotatably holds both lateral ends of the fixing belt 21 in the longitudinal direction X thereof, respectively. Hence, the lubricant is also interposed between each of the belt holders 27 and the fixing belt 21 so that the lubricant decreases sliding friction with which the fixing belt 21 slides over the belt holders 27. For example, if the belt holder 27 is made of a material containing glass fiber, the glass fiber exposed from a surface of the belt holder 27 may damage the fixing belt 21, hinder rotation of the fixing belt 21, and degrade quality of a toner image formed on a sheet P. To address the circumstance, the lubricant such as the silicone oil, the silicone grease, the fluorine grease, and the fluorine oil is preferably interposed between an outer circumferential face of the belt holder 27 and the inner circumferential face 21*b* of the fixing belt 21.

As described above, the fixing device 20 includes slide aids such as the nip formation pad 24 and the belt holder 27 over which the fixing belt 21, that rotates, slides relatively. In order to improve sliding of the fixing belt 21, the silicone oil, the silicone grease, the fluorine grease, the fluorine oil, or the like is generally used as the lubricant. Among the above-described lubricants, the silicone oil and the silicone grease have reasonable heat resistance and are available at reduced costs compared to the fluorine oil and the fluorine grease, thus being preferably used as the lubricant.

Generally, a surface temperature of a contact portion of the fixing belt 21, that contacts a sheet P, affects quality of a toner image on the sheet P substantially, thus being managed strictly. Hence, the fixing device 20 according to the embodiment also manages the surface temperature of the contact portion of the fixing belt 21. When the fixing belt 21 fixes an unfixed toner image on a sheet P, as the sheet P contacts the fixing belt 21, heat is conducted from the fixing belt 21 to the sheet P and is consumed. In order to compensate for the consumed heat, the heaters 23 supply heat to the fixing belt 21. Conversely, heat is barely consumed in a non-contact portion of the fixing belt 21, that does not contact the sheet P, while the sheet P is conveyed over the fixing belt 21. Accordingly, when a plurality of sheets P is conveyed over the fixing belt 21 continuously, the non-contact portion of the fixing belt 21 stores heat and is subject to temperature increase.

Figure 4:
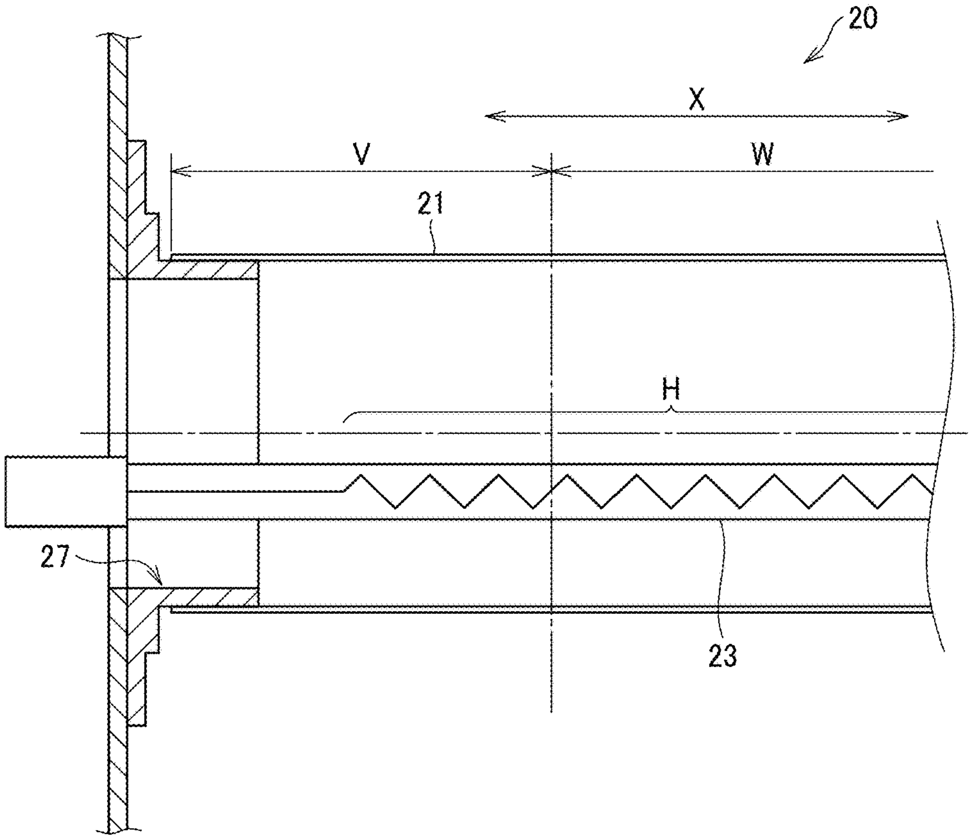
FIG. 4 is a cross-sectional view of the fixing device depicted in FIG. 3, illustrating a lateral end of a fixing belt incorporated in the fixing device in a longitudinal direction of the fixing belt.

As illustrated in FIG. 4, a non-conveyance span V is outboard from a maximum sheet conveyance span W (e.g., a maximum recording medium conveyance span) in the longitudinal direction X of the fixing belt 21. A sheet P having a maximum width is conveyed in the maximum sheet conveyance span W. The fixing belt 21 is subject to temperature increase in the non-conveyance span V. As the fixing belt 21 suffers from temperature increase, the belt holder 27 that holds the fixing belt 21 in the non-conveyance span V also suffers from temperature increase. Accordingly, the silicone oil or the silicone grease that adheres to the belt holder 27 also suffers from temperature increase. For example, as illustrated in FIG. 4, the heater 23 includes a heat generation portion H that extends beyond the maximum sheet conveyance span W in the longitudinal direction X of the fixing belt 21. Accordingly, the fixing belt 21 in the non-conveyance span V suffers from notable temperature increase. Consequently, as the belt holder 27 suffers from temperature increase, the silicone oil or the silicone grease also suffers from notable temperature increase.

As a result, the silicone oil or the silicone grease interposed between the belt holder 27 and the fixing belt 21 suffers from temperature increase. As the siloxanes that are not smaller than the dodecamer and not greater than the heptadecamer and are contained in the silicone oil or the silicone grease volatilize, the ultrafine particles may generate.

Figure 5:
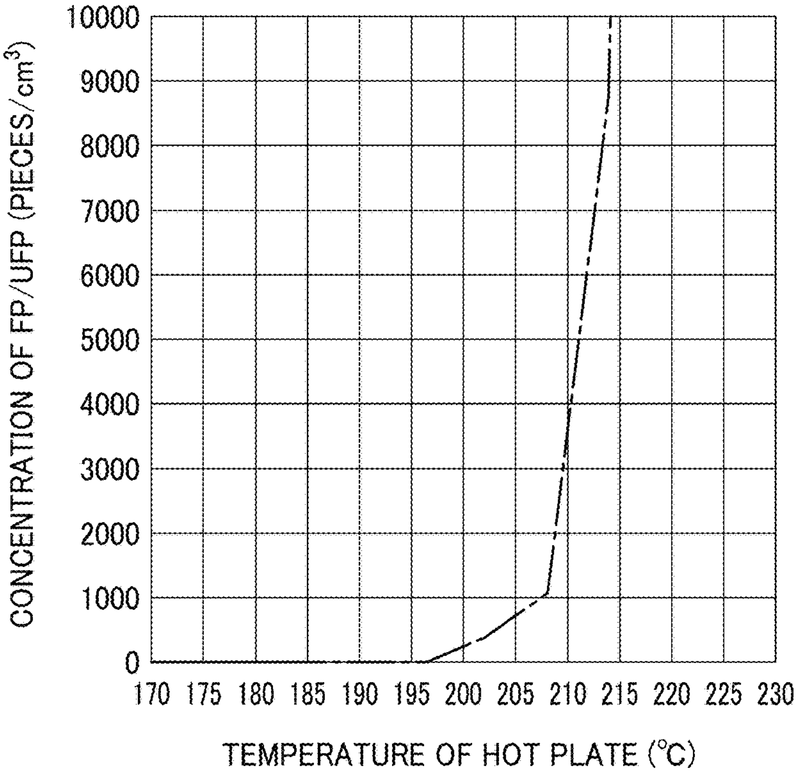
FIG. 5 is a graph illustrating a relation between a temperature of a lubricant and a concentration of ultrafine particles that generate from the lubricant.

FIG. 5 is a graph illustrating a relation between a temperature of a hot plate and a concentration of fine particles or ultrafine particles (FP/UFP) in a measurement ambience. The temperature of the hot plate was measured when the hot plate heated general silicone oil used for the belt holder 27. The concentration of the FP/UFP denotes a number of the FP/UFP per 1 $cm^3$.

Figure 6:
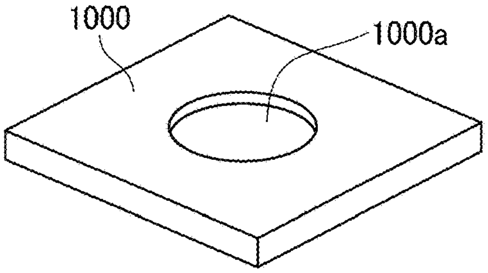
FIG. 6 is a perspective view of a sample container.

In a test for examining the relation illustrated in FIG. 5, silicone oil in a sample container was heated in a 1-cubic meter chamber that conformed to Japanese Industrial Standards JIS A 1901 at a ventilation rate of 5 times. As illustrated in FIG. 6, a sample container 1000 is an aluminum plate having a length of 50 mm, a width of 50 mm, and a height of 5 mm. The sample container 1000 includes a cavity 1000*a* having a diameter of 22 mm and a depth of 2 mm. A sample was placed in the cavity 1000*a*. The sample container 1000 placed with the sample was placed on a hot plate of a heating device (e.g., the clean hot plate MH-180CS and the controller MH-3CS manufactured by AS ONE Corporation). The hot plate heated the sample at a preset temperature of 250 degrees Celsius. While a temperature of the hot plate was monitored, a number concentration of the FP/UFP in the chamber was measured with a measurement device (e.g., the Fast Mobility Particle Sizer™ (FMPS) spectrometer Model 3091 manufactured by TSI Incorporated) with a use averaging interval of 30 seconds during export. An amount of the sample (e.g., an amount of silicone oil) was 36 µl. FIG. 5 illustrates the temperature of the hot plate on a horizontal axis. Temperature increase of the hot plate changes approximately in sync with temperature increase of the lubricant. Hence, the temperature of the hot plate is regarded as the temperature of the silicone oil.

As illustrated in FIG. 5, the FP/UFP started generating approximately when the temperature of the silicone oil reached 200 degrees Celsius. Approximately when the temperature of the silicone oil exceeded 210 degrees Celsius, the number concentration of the FP/UFP increased sharply. At a temperature not lower than 210 degrees Celsius at which the number concentration of the FP/UFP increased sharply, the number concentration of the FP/UFP in the chamber was 4,000 pieces/$cm^3$ or more.

As described above, when the temperature of the silicone oil generally used reaches 200 degrees Celsius, the siloxanes that are not smaller than the dodecamer and not greater than the heptadecamer and are contained in the silicone oil volatilize, generating the FP/UFP. Although FIG. 5 does not illustrate, like the silicone oil, when the temperature of the silicone grease reaches 200 degrees Celsius, the silicone grease also generates the FP/UFP.

Accordingly, in the fixing device 20 in which the temperature of the belt holder 27 reaches 200 degrees Celsius or higher while fixing (e.g., conveying a plurality of sheets P continuously), in order to suppress generation of the ultrafine particles, the concentration of the siloxanes is requested to decrease. The siloxanes are in a range of from the dodecamer to the heptadecamer (e.g., not smaller than the dodecamer and not greater than the heptadecamer). The siloxanes are contained in the silicone oil or the silicone grease adhered to the belt holder 27 and are a main source of the ultrafine particles. To address the circumstance, according to the embodiment, the concentration of the siloxanes that are from the dodecamer to the heptadecamer and are contained in the silicone oil or the silicone grease adhered to the belt holder 27 is not smaller than 0 ppm and not greater than 1.250 ppm. Accordingly, the fixing device 20 in which the temperature of the belt holder 27 reaches 200 degrees Celsius or higher while fixing also suppresses generation of the ultrafine particles effectively. In order to suppress generation of the ultrafine particles further, the concentration of the siloxanes that are from the dodecamer to the heptadecamer and are contained in the silicone oil or the silicone grease adhered to the belt holder 27 is preferably not greater than 500 mm.

A description is provided of one example of the silicone oil used in the fixing device according to the embodiment.

According to the embodiment, the silicone oil interposed between the belt holder 27 and the fixing belt 21 is made of organo polysiloxanes as one example. For example, an organo polysiloxane is a compound defined by a general composition formula (1) below or a compound produced by repetition of a diorgano siloxane unit having a main chain defined by $R_bSiO_{2/2}$. $R_b$ is similar to $R_a$.

$$R_aSiO_{(4-a)/2} \tag{1}$$

In the formula (1), $R_a$ represents a univalent hydrocarbon group that may have a substituent having a carbon number in a range of from 1 to 20. A value a represents an arbitrary number in a range of from 1 to 2.5. For example, the univalent hydrocarbon group that may have the substituent having the carbon number in a range of from 1 to 20, that is represented by $R_a$, includes an alkyl group such as a methyl group, an ethyl group, a propyl group, an isopropyl group, a butyl group, an isobutyl group, a tert-butyl group, a pentyl group, a hexyl group, a heptyl group, an octyl group, and a decyl group, a cycloalkyl group such as a cyclohexyl group and a cycloheptyl group, an alkenyl group such as a vinyl group, an allyl group, a propenyl group, an isopropenyl group, and a butenyl group, an aryl group such as a phenyl group and a tolyl group, and an aralkyl group such as a benzyl group and a phenylethyl group. Among those, the methyl group is preferable.

If the univalent hydrocarbon group has the substituent, the substituent of modified silicone oil includes a substance in which at least a part of hydrogen of an unsubstituted hydrocarbon group is substituted for an amino group, an epoxy group, a carboxyl group, a carbinol group, a methacrylic group, an acryl group, a mercapto group, a phenol group, a hydroxyl group, a polyether group, an alkoxy group, a halogen atom such as fluorine, chlorine, and bromine, or the like.

Among various silicone oil described above, dimethyl silicone oil, that suppresses generation of the ultrafine particles further, is preferably used. In order to suppress generation of the ultrafine particles, the fixing device 20 according to the embodiment employs the silicone oil in which, among molecules that construct an organo polysiloxane, the siloxanes from the dodecamer to the heptadecamer have a concentration that is not greater than 1,250 ppm, preferably not greater than 500 ppm.

For example, methods for achieving the concentration of the siloxanes from the dodecamer to the heptadecamer, that is not greater than 1,250 ppm, include heating under reduced pressure, refining by solvent extraction with alcohols such as methanol, ethanol, and butanol, and refining by a liquid chromatography using a mixed solvent of toluene and acetone as eluent.

The fixing device 20 according to the embodiment advantageously employs the silicone oil having a viscosity at the fixing temperature, that is not greater than 10,000 cSt (10,000 $mm^2/s$), preferably 5,000 cSt (5,000 $mm^2/s$).

Alternatively, the rotator holder according to the embodiment (e.g., the belt holder 27) may be applied with the silicone grease instead of the silicone oil. The silicone grease uses the silicone oil as base oil and is semi-solidified with a thickener such as metal soap and polyfluoroethylene.

The following describes the technology of the present disclosure in detail with embodiments of the present disclosure and comparative examples. However, the technology of the present disclosure is not limited to the embodiments described below.

A description is provided of an adjustment 1 of silicone oil.

A description is now given of silicone oil used in embodiments and comparative examples depicted in a table 1 below.

A silicone oil 1 depicted in the table 1 is dimethyl silicone oil that is commercially available and has a kinetic viscosity of 104 $mm^2/s$ at 25 degrees Celsius. Other silicone oils 2, 3, and 4 are obtained by vacuum drying of the silicone oil 1 at 195 degrees Celsius, 215 degrees Celsius, and 230 degrees Celsius. The silicone oils 1 to 4 contain cyclic siloxanes from the dodecamer to the heptadecamer that have concentrations that are different from each other as illustrated in the table 1 below. See the concentrations in parentheses beside the silicone oils 1 to 4 in the table 1. The concentrations of the cyclic siloxanes are measured by gas chromatography under measurement conditions below.

[Measurement Conditions]

Column: ZB-5 L=30 m, ID=0.25 mm, Film=0.25 μm

Column temperature increase: 40 degrees Celsius retained for 1 minute, through 20 degrees Celsius per minute, to 320 degrees Celsius retained for 35 minutes Carrier gas: He Ionization method: electron ionization (EI) at 70 eV Measurement mode: total ion chromatogram (TIC)

TABLE 1

| | Print speed (ppm) | Temperature of belt holder (° C.) | Silicone oil adhered to slide sheet (concentration of siloxanes from dodecamer to heptadecamer) |
|---|---|---|---|
| Embodiment 1 | 50 | 203 | Silicone oil 1 (3,600 ppm) |
| Embodiment 2 | | 203 | |
| Embodiment 3 | | 203 | |
| Comparative example 1 | | 203 | |
| Comparative example 2 | | 205 | |

| | Silicone oil adhered to belt holder (concentration of siloxanes from dodecamer to heptadecamer) | Generation speed of ultrafine particles ($\times 10^{11}$ pieces per 10 minutes) | Condition of lateral end of fixing belt after image formation on 50,000 sheets |
|---|---|---|---|
| Embodiment 1 | Silicone oil 3 (980 ppm) | 3.0 | No failure |
| Embodiment 2 | Silicone oil 4 (490 ppm) | 2.4 | No failure |
| Embodiment 3 | Silicone oil 2 (1,240 ppm) | 3.5 | No failure |
| Comparative example 1 | Silicone oil 1 (3,600 ppm) | 5.9 | No failure |
| Comparative example 2 | — | 1.6 | Substantial amount of scratches |

TABLE 1-continued

A description is provided of an embodiment 1.

The embodiment 1 used the fixing device 20 having the construction depicted in FIGS. 2 and 3. The fixing device 20 incorporated the belt holder 27 made of a material containing glass fiber, carbon black, and glass beads in liquid crystal polymer. The silicone oil 1 was impregnated into the slide sheet 30. The silicone oil 3 was applied onto the outer circumferential face of the belt holder 27. The fixing belt 21 rotated for one rotation. The silicone oil 1 was interposed between the inner circumferential face 21*b* of the fixing belt 21 and a slide portion of the slide sheet 30, which contacted the inner circumferential face 21*b* of the fixing belt 21 and over which the fixing belt 21 slid. The silicone oil 3 was interposed between the inner circumferential face 21*b* of the fixing belt 21, that contacted the belt holder 27, and the belt holder 27. The fixing device 20 configured as described above was installed in an image forming apparatus that printed at a print speed of 50 pages per minute (ppm). The image forming apparatus performed continuous printing for 10 minutes at an accredited test site for the German ecolabel, the Blue Angel mark. As a result, according to the embodiment 1, as illustrated in the table 1, the ultrafine particles generated at a generation speed of $3.0\times10^{11}$ pieces per 10 minutes during continuous printing for 10 minutes, that was not greater than $3.5\times10^{11}$ pieces per 10 minutes as an accreditation criterion of the Blue Angel mark. The belt holder 27 had a highest temperature of 203 degrees Celsius during continuous printing for 10 minutes. Further, the image forming apparatus performed printing in an indoor environment and formed images on 50,000 sheets in total. No failure appeared on the lateral end of the fixing belt 21 in the longitudinal direction X thereof.

A description is provided of an embodiment 2.

According to the embodiment 2, the silicone oil 4 was applied on the outer circumferential face of the belt holder 27. Other conditions of the embodiment 2 were identical to the conditions of the embodiment 1 described above. Like the embodiment 1, the image forming apparatus formed images at the accredited test site and the generation speed of the ultrafine particles was measured. As a result, as illustrated in the table 1, according to the embodiment 2, the ultrafine particles generated at a generation speed of $2.4\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had the highest temperature of 203 degrees Celsius during continuous printing for 10 minutes. After the image forming apparatus formed images on 50,000 sheets, no failure appeared on the lateral end of the fixing belt 21 in the longitudinal direction X thereof.

A description is provided of an embodiment 3.

According to the embodiment 3, the silicone oil 2 was applied on the outer circumferential face of the belt holder 27. Other conditions of the embodiment 3 were identical to the conditions of the embodiment 1 described above. Like the embodiment 1, the image forming apparatus formed images at the accredited test site and the generation speed of the ultrafine particles was measured. As a result, as illustrated in the table 1, according to the embodiment 3, the ultrafine particles generated at a generation speed of 3.5×

$10^{11}$ pieces per 10 minutes during continuous printing for 10 minutes, that was not greater than $3.5\times10^{11}$ pieces per 10 minutes as the accreditation criterion of the Blue Angel mark. The belt holder 27 had the highest temperature of 203 degrees Celsius during continuous printing for 10 minutes. After the image forming apparatus formed images on 50.000 sheets, no failure appeared on the lateral end of the fixing belt 21 in the longitudinal direction X thereof.

A description is provided of a comparative example 1.

According to the comparative example 1, the silicone oil 1 was applied on the outer circumferential face of the belt holder 27. Other conditions of the comparative example 1 were identical to the conditions of the embodiment 1 described above. Like the embodiment 1, the image forming apparatus formed images at the accredited test site and the generation speed of the ultrafine particles was measured. As a result, as illustrated in the table 1, according to the comparative example 1, the ultrafine particles generated at a generation speed of $5.9\times10^{11}$ pieces per 10 minutes during continuous printing for 10 minutes, that was greater than $3.5\times10^{11}$ pieces per 10 minutes as the accreditation criterion of the Blue Angel mark. The belt holder 27 had the highest temperature of 203 degrees Celsius during continuous printing for 10 minutes. After the image forming apparatus formed images on 50,000 sheets, no failure appeared on the lateral end of the fixing belt 21 in the longitudinal direction X thereof.

A description is provided of a comparative example 2.

According to the comparative example 2, no silicone oil was applied on the outer circumferential face of the belt holder 27. Other conditions of the comparative example 2 were identical to the conditions of the embodiment 1 described above. Like the embodiment 1, the image forming apparatus formed images at the accredited test site and the generation speed of the ultrafine particles was measured. As a result, as illustrated in the table 1, according to the comparative example 2, the ultrafine particles generated at a generation speed of $1.6\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had a highest temperature of 205 degrees Celsius during continuous printing for 10 minutes. After the image forming apparatus formed images on 50,000 sheets, a substantial number of scratches appeared on the lateral end of the fixing belt 21 in the longitudinal direction X thereof.

A description is provided of an adjustment 2 of silicone oil.

A description is now given of silicone oil used in embodiments and comparative examples depicted in a table 2 below.

The table 2 illustrates silicone oils 5, 6, and 7 obtained by mixing and agitating the silicone oil 1 in ethanol, thereafter leaving, separating the silicone oil 1 from ethanol to extract the silicone oil 1, treating the extracted silicone oil 1 with vacuum drying at 180 degrees Celsius, 200 degrees Celsius, and 220 degrees Celsius. The table 2 illustrates a silicone oil 8 obtained by refining the silicone oil 1 by liquid chromatography (LC) under conditions below.

[Refining Conditions]

Device: Hi-Sep LC Prep A type manufactured by Soken Chemical & Engineering Co., Ltd.

Column: diameter of 20 mm, length of 250 mm

Filler: ODS-W 15/30 μm manufactured by Soken Chemical & Engineering Co., Ltd.

Eluent: acetone/toluene stepwise

Cleaning solution: 100% toluene

Detector: refractive index (RI) detector, range 64

Flow rate: 13 ml per minute (linear velocity of 4.12 cm per minute)

Temperature: room temperature of 25 degrees Celsius

Specimen: dimethylpolysiloxane/[solvent: acetone plus toluene (mixing ratio: 10/4)]

TABLE 2

| | Print speed (ppm) | Temperature of belt holder (° C.) | Silicone oil adhered to slide sheet (concentration of siloxanes from dodecamer to heptadecamer) |
|---|---|---|---|
| Embodiment 4 | 60 | 212 | Silicone oil 5 (640 ppm) |
| Embodiment 5 | | | |
| Embodiment 6 | | | |
| Embodiment 7 | | | |
| Comparative example 3 | | | Silicone oil 8 (15 ppm) |

| | Silicone oil adhered to belt holder (concentration of siloxanes from dodecamer to heptadecamer) | Generation speed of ultrafine particles ($\times10^{11}$ pieces per 10 minutes) |
|---|---|---|
| Embodiment 4 | Silicone oil 5 (640 ppm) | 3.0 |
| Embodiment 5 | Silicone oil 6 (420 ppm) | 2.6 |
| Embodiment 6 | Silicone oil 7 (120 ppm) | 1.5 |
| Embodiment 7 | Silicone oil 8 (15 ppm) | 0.8 |
| Comparative example 3 | Silicone oil 1 (3,600 ppm) | 6.6 |

A description is provided of an embodiment 4.

According to the embodiment 4, the silicone oil 5 was impregnated into the slide sheet 30 and was applied on the outer circumferential face of the belt holder 27. Other conditions of the embodiment 4 were identical to the conditions of the embodiment 1 described above. The fixing device 20 according to the embodiment 4 was installed in an image forming apparatus that had a print speed of 60 pages per minute (ppm). The image forming apparatus performed continuous printing for 10 minutes at the accredited test site for the German ecolabel, the Blue Angel mark. As a result, according to the embodiment 4, as illustrated in the table 2, the ultrafine particles generated at a generation speed of $3.0\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had a highest temperature of 212 degrees Celsius during continuous printing for 10 minutes.

A description is provided of an embodiment 5.

According to the embodiment 5, the silicone oil 6 was applied on the outer circumferential face of the belt holder 27. Other conditions of the embodiment 5 were identical to the conditions of the embodiment 4 described above. Like the embodiment 4, the image forming apparatus formed images at the accredited test site and the generation speed of the ultrafine particles was measured. As a result, as illustrated in the table 2, according to the embodiment 5, the ultrafine particles generated at a generation speed of $2.6\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had the highest temperature of 212 degrees Celsius during continuous printing for 10 minutes.

A description is provided of an embodiment 6.

According to the embodiment 6, the silicone oil 7 was applied on the outer circumferential face of the belt holder 27. Other conditions of the embodiment 6 were identical to the conditions of the embodiment 4 described above. Like the embodiment 4, the image forming apparatus formed images at the accredited test site and the generation speed of the ultrafine particles was measured. As a result, as illustrated in the table 2, according to the embodiment 6, the ultrafine particles generated at a generation speed of $1.5\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had the highest temperature of 212 degrees Celsius during continuous printing for 10 minutes.

A description is provided of an embodiment 7.

According to the embodiment 7, the silicone oil 8 was applied on the outer circumferential face of the belt holder 27. Other conditions of the embodiment 7 were identical to the conditions of the embodiment 4 described above. Like the embodiment 4, the image forming apparatus formed images at the accredited test site and the generation speed of the ultrafine particles was measured. As a result, as illustrated in the table 2, according to the embodiment 7, the ultrafine particles generated at a generation speed of $0.8\times10^{11}$ pieces per 10 minutes during continuous printing for 10 minutes, that was not greater than $3.5\times10^{11}$ pieces per 10 minutes as the accreditation criterion of the Blue Angel mark. The belt holder 27 had the highest temperature of 212 degrees Celsius during continuous printing for 10 minutes.

A description is provided of a comparative example 3.

According to the comparative example 3, the silicone oil 8 was impregnated into the slide sheet 30. The silicone oil 1 was applied on the outer circumferential face of the belt holder 27. Other conditions of the comparative example 3 were identical to the conditions of the embodiment 4 described above. Like the embodiment 4, the image forming apparatus formed images at the accredited test site and the generation speed of the ultrafine particles was measured. As a result, as illustrated in the table 2, according to the comparative example 3, the ultrafine particles generated at a generation speed of $6.6\times10^{11}$ pieces per 10 minutes during continuous printing for 10 minutes, that was greater than $3.5\times10^{11}$ pieces per 10 minutes as the accreditation criterion of the Blue Angel mark. The belt holder 27 had the highest temperature of 212 degrees Celsius during continuous printing for 10 minutes.

As described above, according to results depicted in the tables 1 and 2, according to each of the embodiments 1 to 7 in which the concentration of the cyclic siloxanes from the dodecamer to the heptadecamer, that were contained in the silicone oil, was not greater than 1,250 ppm, the ultrafine particles generated at a generation speed during continuous printing for 10 minutes, that was not greater than $3.5\times10^{11}$ pieces per 10 minutes as the accreditation criterion of the Blue Angel mark. Conversely, according to each of the comparative examples 1 and 3 in which the concentration of the cyclic siloxanes from the dodecamer to the heptadecamer, that were contained in the silicone oil, was greater than 1,250 ppm, the ultrafine particles generated at a generation speed during continuous printing for 10 minutes, that was greater than $3.5\times10^{11}$ pieces per 10 minutes as the accreditation criterion of the Blue Angel mark. Accordingly, the concentration of the siloxanes that are from the dodecamer to the heptadecamer and are contained in the silicone oil adhered to the belt holder 27 is not greater than 1, 250 ppm, thus suppressing generation of the ultrafine particles during continuous printing for 10 minutes effectively. The concentration of the siloxanes from the dodecamer to the heptadecamer is preferably not greater than 500 ppm, suppressing generation of the ultrafine particles further. Since the siloxanes from the dodecamer to the heptadecamer generate the ultrafine particles, as an amount of the siloxanes that are from the dodecamer to the heptadecamer and are contained in the silicone oil decreases, an amount of the ultrafine particles decreases. The amount of the siloxanes that are from the dodecamer to the heptadecamer and are contained in the silicone oil decreases by a general refining method, even to 0 ppm. For example, with the liquid chromatography (LC) used to refine the silicone oil 8, refining is repeated three times to obtain the concentration of 0 ppm of the siloxanes that are from the dodecamer to the heptadecamer and are contained in the silicone oil. With the silicone oil containing the siloxanes from the dodecamer to the heptadecamer, that had the concentration of 0 ppm, instead of the silicone oil 8 according to the embodiment 7, the image forming apparatus formed images similarly. The ultrafine particles generated at a generation speed of $0.8\times10^{11}$ pieces per 10 minutes during continuous printing for 10 minutes, that was not greater than $3.5\times10^{11}$ pieces per 10 minutes as the accreditation criterion of the Blue Angel mark. Hence, according to the embodiments 1 to 7 of the present disclosure, the siloxanes that are from the dodecamer to the heptadecamer and are contained in the silicone oil have a concentration not smaller than 0 ppm and not greater than 1,250 ppm.

According to the comparative example 2 depicted in the table 1, the substantial number of scratches appeared on the lateral end of the fixing belt 21 in the longitudinal direction X thereof. In order to suppress generation of the scratches, the lubricant such as the silicone oil is to be interposed between the belt holder 27 and the fixing belt 21. Conversely, according to the embodiments 1 to 7, since the silicone oil was interposed between the belt holder 27 and the fixing belt 21, no failure appeared on the lateral end of the fixing belt 21 in the longitudinal direction X thereof. Hence, the embodiments 1 to 7 suppress damage to the lateral end of the fixing belt 21 in the longitudinal direction X thereof, extending a life of the fixing device 20 and suppressing generation of the ultrafine particles. As described above, according to the embodiments 1 to 7 of the present disclosure, even with the construction of the fixing device 20 in which the silicone oil is interposed between the belt holder 27 and the fixing belt 21 to suppress damage to the fixing belt 21, the fixing device 20 suppresses generation of the ultrafine particles, attaining an extended life and a reduced generation amount of the ultrafine particles.

Generally, as productivity of image formation increases, for example, as a print speed increases, an amount of heat supplied from the heaters 23 to the fixing belt 21 increases. Hence, the belt holder 27 is also subject to temperature increase. For example, if an image forming apparatus performs image formation at a print speed of 50 ppm or higher at which images are formed on 50 or more sheets having an A4 size per minute, the belt holder 27 may likely have a temperature of 200 degrees Celsius or higher. Hence, in the image forming apparatus, the silicone oil or the silicone grease adhered to the belt holder 27 may have a temperature of 200 degrees Celsius or higher at which the ultrafine particles generate, thus generating a substantial amount of the ultrafine particles.

Figure 7:
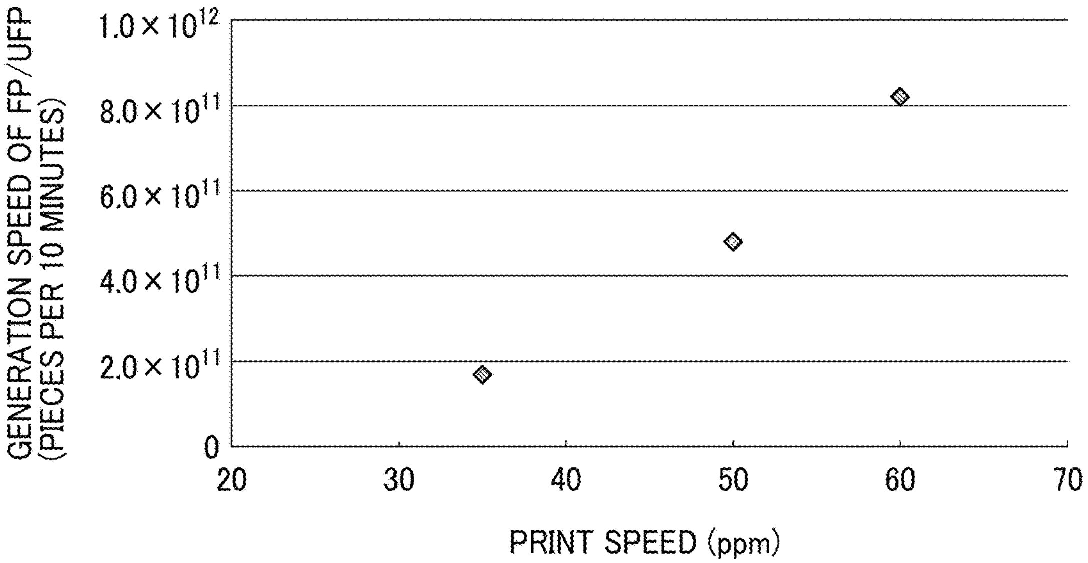
FIG. 7 is a graph illustrating a relation between a print speed and a generation speed of ultrafine particles.

For example, temperature increase of the belt holder 27, that generates the ultrafine particles, becomes more pronounced as the image forming apparatus increases a number of prints per unit time. Hence, the embodiments 1 to 7 of the present disclosure are more advantageous if the embodiments 1 to 7 are applied to the image forming apparatus that prints on an increased number of sheets. FIG. 7 illustrates a relation between a print speed and a generation speed (e.g., a number) of the FP/UFP generated. The number of the FP/UFP generated from the fixing device 20 during continuous printing for 10 minutes increases sharply approximately at a print speed exceeding 50 ppm. Hence, the embodiments 1 to 7 of the present disclosure are more advantageous if the embodiments 1 to 7 are applied to the fixing device 20 or the image forming apparatus 100 that prints at a print speed of 50 ppm or higher.

If a highest temperature of the belt holder 27 reaches a highest temperature range not lower than 200 degrees Celsius and not higher than 240 degrees Celsius during continuous printing for 10 minutes, the temperature of the silicone oil or the silicone grease may likely reach 200 degrees Celsius or higher at which the ultrafine particles generate. Hence, the embodiments 1 to 7 of the present disclosure are more advantageous if the embodiments 1 to 7 are applied to the fixing device 20 in which the belt holder 27 has the highest temperature range not lower than 200 degrees Celsius and not higher than 240 degrees Celsius during continuous printing for 10 minutes.

The temperature of the belt holder 27 reaches the highest temperature range not lower than 200 degrees Celsius and not higher than 240 degrees Celsius during continuous printing for 10 minutes, because the image forming apparatus 100 is frequently used for continuous printing within a few minutes in a general market and is barely used for continuous printing for five minutes or longer. To address the circumstance, according to the embodiments of the present disclosure, suppression of generation of the ultrafine particles at least during continuous printing for 10 minutes is satisfactory.

The highest temperature of a belt holder (e.g., the belt holder 27) during continuous printing for 10 minutes denotes a maximum temperature of the belt holder 27 measured with processes described below. The processes for temperature measurement include placing an image forming apparatus (e.g., the image forming apparatus 100) installed with a fixing device or a heating device (e.g., the fixing device 20) in a test chamber at an ambient temperature of 23 degrees Celsius, turning on a power supply of the image forming apparatus to start the image forming apparatus, and sending a print instruction after a standby time for 60 minutes, for example, elapses. As print conditions, a mode in which a highest print speed is set as a default print speed is selected. Sheets having a paper weight of 70 $g/m^2$ and an A4 size or a letter size are used. Sheets for which conveyance in landscape orientation is available are conveyed in landscape orientation. Sheets for which conveyance in landscape orientation is not available are conveyed in portrait orientation. Conveyance in landscape orientation denotes that a sheet is conveyed in a state in which a long side of the sheet extends in an orthogonal direction perpendicular to a conveyance direction of the sheet. Conveyance in portrait orientation denotes that a sheet is conveyed in a state in which a short side of the sheet extends in the orthogonal direction perpendicular to the conveyance direction of the sheet. From a print start time when a first sheet is ejected from a sheet tray (e.g., the sheet tray 14), a thermocouple measures a temperature of the belt holder for 10 minutes. However, if a continuous print time is restricted to 10 minutes or shorter in relation to a capacity of an output tray (e.g., the output tray 18) and a capacity of the sheet tray, the temperature of the belt holder is measured within the continuous print time. In addition to the processes for temperature measurement described above, the temperature of the belt holder may be measured with a device and a condition that conform to criteria of the Blue Angel mark for the ultrafine particles.

The above describes the embodiments of the present disclosure. However, application of the technology of the present disclosure is not limited to the fixing device 20 having the construction depicted in FIGS. 2 to 4. The technology of the present disclosure is also applied to fixing devices having other constructions. The following describes constructions of fixing devices applied with the technology of the present disclosure.

Figure 8:
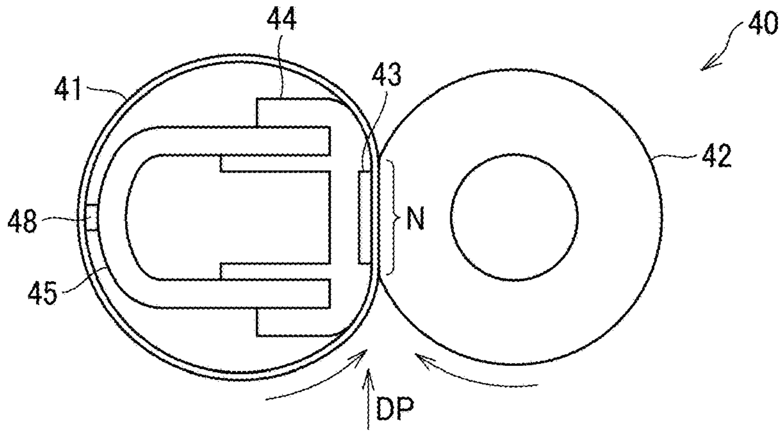
FIG. 8 is a cross-sectional view of a fixing device according to another embodiment of the present disclosure, that is installable in the image forming apparatus depicted in FIG. 1.
Figure 9:
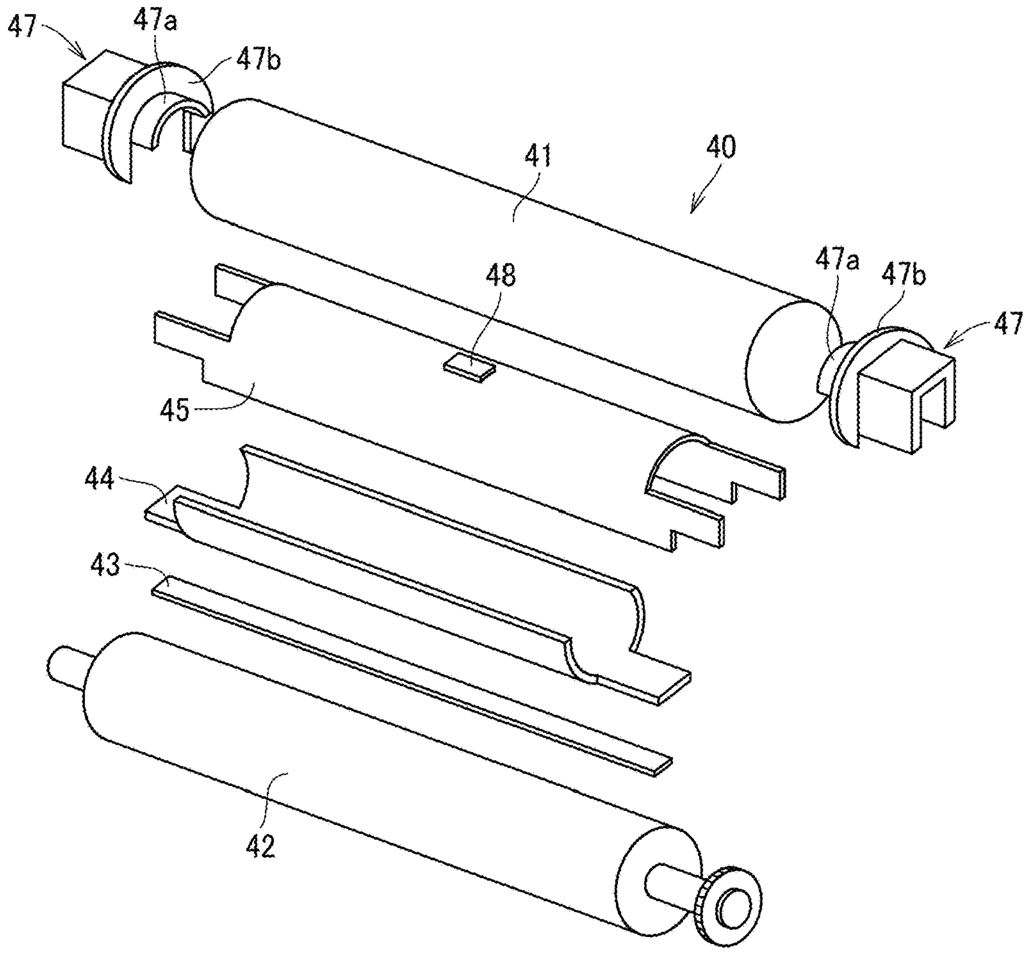
FIG. 9 is an exploded perspective view of the fixing device depicted in FIG. 8.

Referring to FIGS. 8 and 9, a description is provided of a construction of a fixing device 40 according to an embodiment of the present disclosure.

The fixing device 40 includes a fixing belt 41 serving as a first rotator, a rotator, or an endless belt, a pressure roller 42 serving as a second rotator or an opposed rotator, a heater 43 serving as a heat source, a heater holder 44 serving as a heat source holder, a pressure stay 45 serving as a support, a thermistor 48 serving as a temperature detector, and flanges 47 serving as rotator holders depicted in FIG. 9.

The fixing belt 41 and the pressure roller 42 depicted in FIG. 8 have functions and constructions that are basically equivalent to those of the fixing belt 21 and the pressure roller 22 depicted in FIG. 2, respectively.

The heater 43 is a ceramic heater that includes a platy substrate and resistive heat generators mounted on the substrate. As power is supplied to the resistive heat generators, the heater 43 generates heat. The heater 43 contacts an inner circumferential face of the fixing belt 41. As the heater 43 generates heat, the heater 43 heats the inner circumferential face of the fixing belt 41. The heater 43 also serves as a nip formation pad that forms the fixing nip N at which the heater 43 and the pressure roller 42 sandwich the fixing belt 41.

The heater holder 44 serves as the heat source holder that holds the heater 43. The heater holder 44 is made of heat-resistant resin, for example. The heater holder 44 is semicircular in cross section along the inner circumferential face of the fixing belt 41. The heater holder 44 restricts a rotation orbit of the fixing belt 41.

The pressure stay 45 serves as a support that supports the heater holder 44. As the pressure stay 45 supports the heater holder 44, the pressure stay 45 prevents the heater holder 44 and the heater 43 from being bent by pressure from the pressure roller 42. Accordingly, the fixing nip N, having an even length in the sheet conveyance direction DP throughout an entire span of the fixing belt 41 in a longitudinal direction thereof, is formed between the fixing belt 41 and the pressure roller 42. The pressure stay 45 is preferably made of a metal material such as stainless used steel (SUS) to achieve rigidity.

The pressure stay 45 mounts the thermistor 48 serving as the temperature detector. The thermistor 48 is disposed opposite the inner circumferential face of the fixing belt 41 such that the thermistor 48 contacts or does not contact the inner circumferential face of the fixing belt 41, thus detecting the temperature of the fixing belt 41.

Like the belt holders 27, the flanges 47 serve as a pair of holders, rotator holders, or belt holders that holds both lateral ends of the fixing belt 41 in the longitudinal direction thereof, respectively. Each of the flanges 47 includes a backup portion 47*a* and a flange portion 47*b*. The backup portion 47*a* serves as an insertion portion that is inserted into a loop formed by the fixing belt 41. The flange portion 47*b* serves as a restrictor that restricts motion of the fixing belt 41 in the longitudinal direction thereof. As a biasing member such as a spring biases each of the flanges 47 against each lateral end of the fixing belt 41 in the longitudinal direction thereof, each of the flanges 47 is held within the loop formed by the fixing belt 41 in a state in which each of the flanges 47 is inserted into the loop formed by the fixing belt 41.

With the above-described construction of the fixing device 40 also, as the heater 43 generates heat, the temperature of the flanges 47 increases. Accordingly, the siloxanes that are from the dodecamer to the heptadecamer and are contained in the silicone oil or the silicone grease adhered to the flanges 47 may volatilize, generating the ultrafine particles. To address the circumstance, the fixing device 40 depicted in FIGS. 8 and 9 is also applied with the technology of the present disclosure, suppressing generation of the ultrafine particles.

A description is provided of a construction of a fixing device 50 according to an embodiment of the present disclosure.

Figure 10:
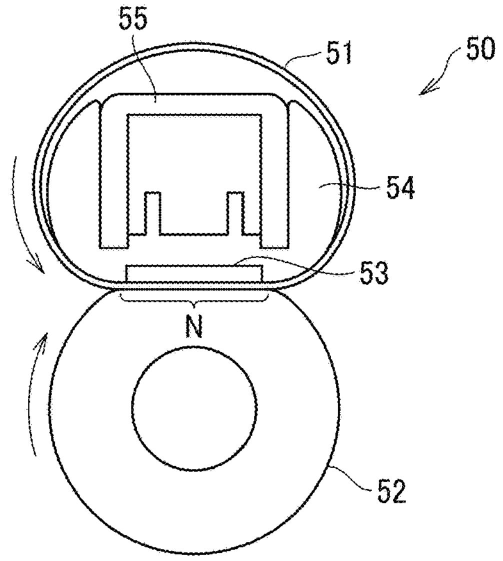
FIG. 10 is a cross-sectional view of a fixing device according to yet another embodiment of the present disclosure, that is installable in the image forming apparatus depicted in FIG. 1.
Figure 11:
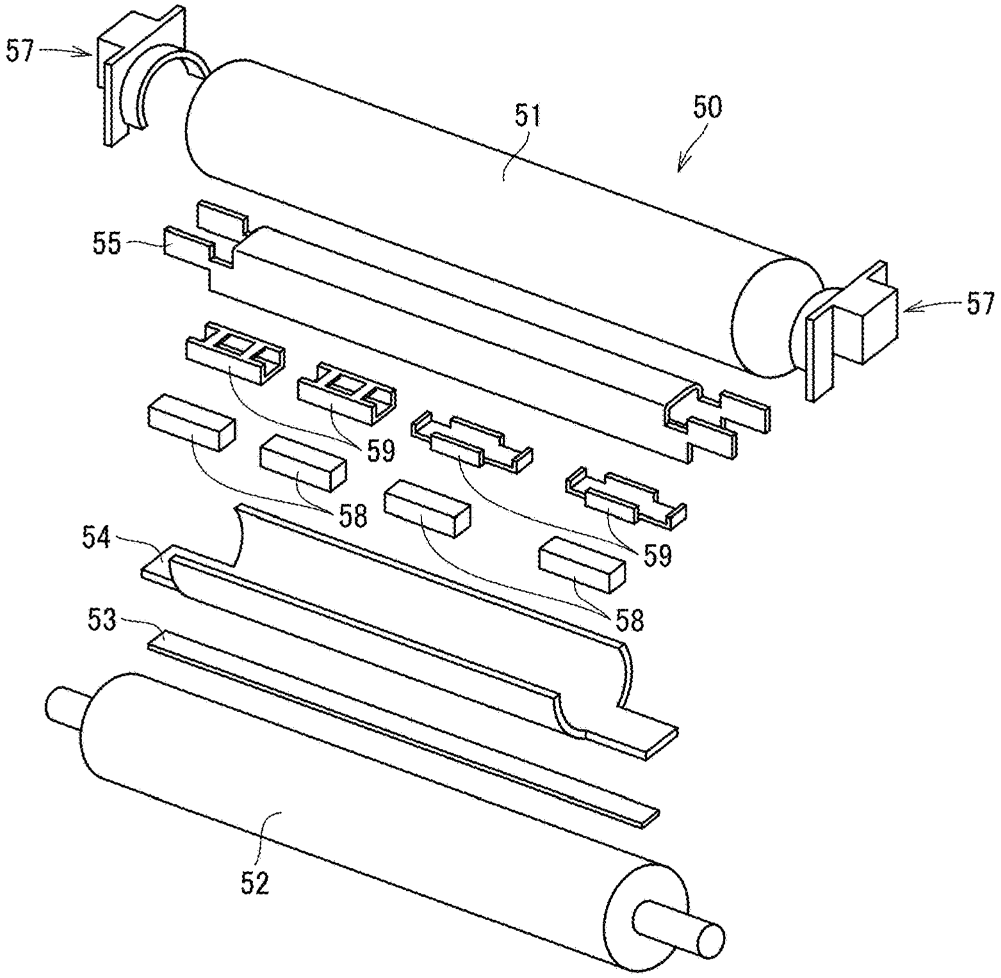
FIG. 11 is an exploded perspective view of the fixing device depicted in FIG. 10.

As illustrated in FIGS. 10 and 11, the fixing device 50 includes a heater 53 (e.g., a ceramic heater) like the fixing device 40 depicted in FIGS. 8 and 9. For example, the fixing device 50 depicted in FIGS. 10 and 11 includes a fixing belt 51 serving as a first rotator, a rotator, or an endless belt, a pressure rotator 52 (e.g., a pressure roller) serving as a second rotator or an opposed rotator, the heater 53 serving as a heat source and a nip formation pad, a heater holder 54 serving as a heat source holder, a reinforcement 55 serving as a support, belt holders 57 serving as rotator holders depicted in FIG. 11, thermosensitive elements 58 serving as temperature detectors depicted in FIG. 11, and covers 59 depicted in FIG. 11.

The fixing belt 51, the pressure rotator 52, the heater 53, the heater holder 54, the reinforcement 55, and the belt holders 57 depicted in FIGS. 10 and 11 have functions and constructions that are basically equivalent to those of the fixing belt 41, the pressure roller 42, the heater 43, the heater holder 44, the pressure stay 45, and the flanges 47 depicted in FIGS. 8 and 9, respectively.

The thermosensitive elements 58 are mounted on an opposite face of the heater holder 54, that is opposite to a heater holding face of the heater holder 54, that holds the heater 53. The thermosensitive elements 58 detect a temperature of the heater 53 through the heater holder 54. A controller controls heat generation of the heater 53 based on the temperature of the heater 53, that is detected by the thermosensitive elements 58, thus retaining a predetermined fixing temperature of the fixing belt 51.

Each of the covers 59 is a box made of heat-resistant resin. As the covers 59 are disposed opposite the heater holder 54 via the thermosensitive elements 58 within a loop formed by the fixing belt 51, the covers 59 cover the thermosensitive elements 58 disposed opposite the covers 59, respectively.

As described above, the fixing device 50 applied with the technology of the present disclosure includes the thermosensitive elements 58 that detect the temperature of the heater 53 and the covers 59 that cover the thermosensitive elements 58.

A description is provided of a construction of a fixing device 60 according to an embodiment of the present disclosure.

Figure 12:
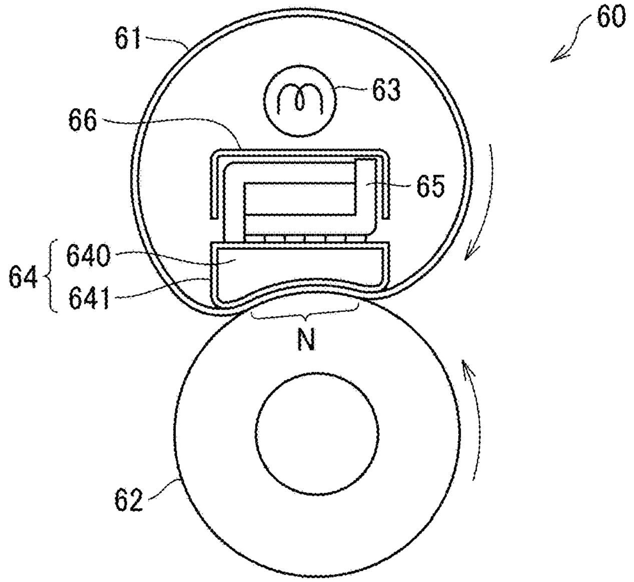
FIG. 12 is a cross-sectional view of a fixing device according to yet another embodiment of the present disclosure, that is installable in the image forming apparatus depicted in FIG. 1.

As illustrated in FIG. 12, the fixing device 60 includes a heater 63 (e.g., a halogen heater) serving as a heat source, like the fixing device 20 depicted in FIGS. 2 and 3. For example, the fixing device 60 depicted in FIGS. 12 and 13 includes a fixing belt 61 serving as a first rotator, a rotator, or an endless belt, a pressure roller 62 serving as a second rotator or an opposed rotator, the heater 63 serving as a heat source, a nip formation pad 64, a support 65, a reflection plate 66 serving as a reflector, holding frames 67 serving as rotator holders depicted in FIG. 13, and rings 68 serving as slide aids depicted in FIG. 13.

Figure 13:
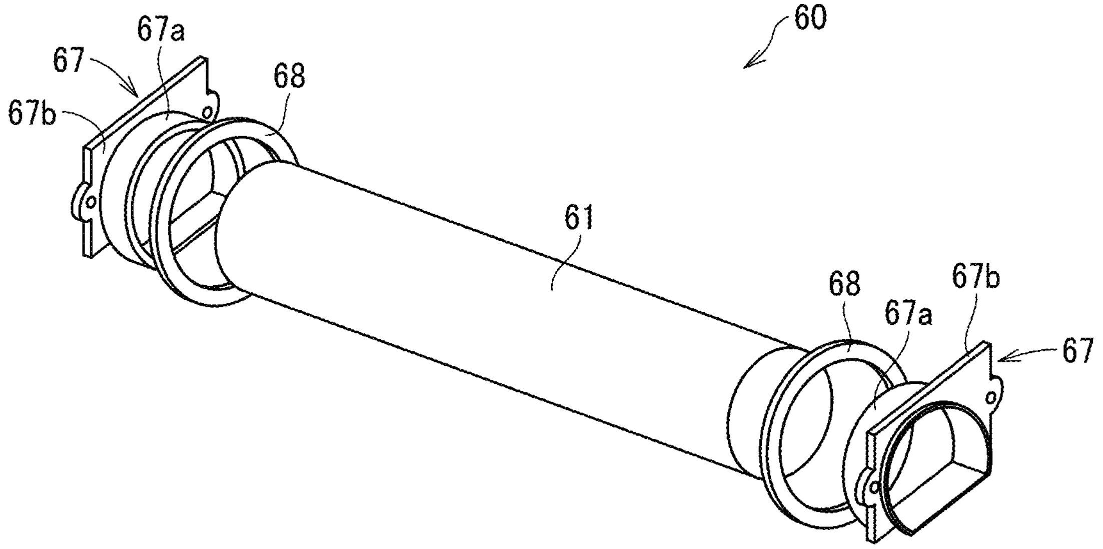
FIG. 13 is an exploded perspective view of the fixing device depicted in FIG. 12.

The fixing belt 61, the pressure roller 62, the heater 63, the nip formation pad 64, the support 65, the reflection plate 66, and the holding frames 67 depicted in FIGS. 12 and 13 have functions and constructions that are basically equivalent to those of the fixing belt 21, the pressure roller 22, the heater 23, the nip formation pad 24, the stay 25, the reflector 26, and the belt holders 27 depicted in FIGS. 2 and 3, respectively. The nip formation pad 64 includes a base pad 640 and a slide sheet 641. The base pad 640 is made of metal. The slide sheet 641 is interposed between the base pad 640 and an inner circumferential face of the fixing belt 61 and is made of fluororesin.

Each of the holding frames 67 includes a tube 67*a* and a securing plate 67*b*. The ring 68 is attached to an outer circumferential face of the tube 67*a* that serves as an insertion portion of the holding frame 67 and is inserted into a loop formed by the fixing belt 61. The ring 68 is interposed between a lateral edge of the fixing belt 61 in a longitudinal direction thereof and the securing plate 67*b* serving as a restrictor of the holding frame 67. As the fixing belt 61 rotates, the rings 68 rotate in accordance with rotation of the fixing belt 61 or the fixing belt 61 slides over the rings 68 having low friction, thus decreasing sliding friction that generates between the fixing belt 61 and the holding frames 67.

As described above, the fixing device 60 applied with the technology of the present disclosure includes the rings 68.

A description is provided of a construction of a fixing device 70 according to an embodiment of the present disclosure.

Figure 14:
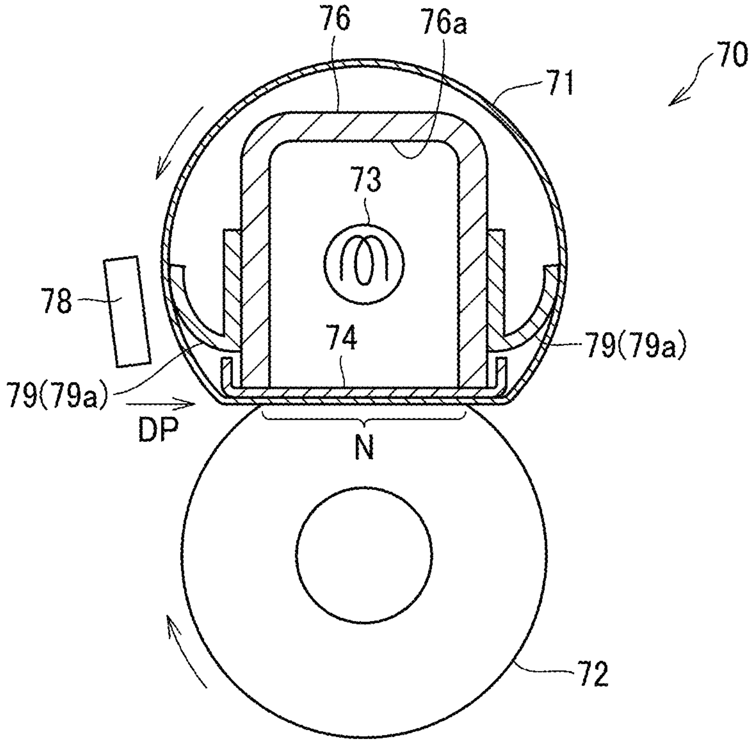
FIG. 14 is a cross-sectional view of a fixing device according to yet another embodiment of the present disclosure, that is installable in the image forming apparatus depicted in FIG. 1.
Figure 15:
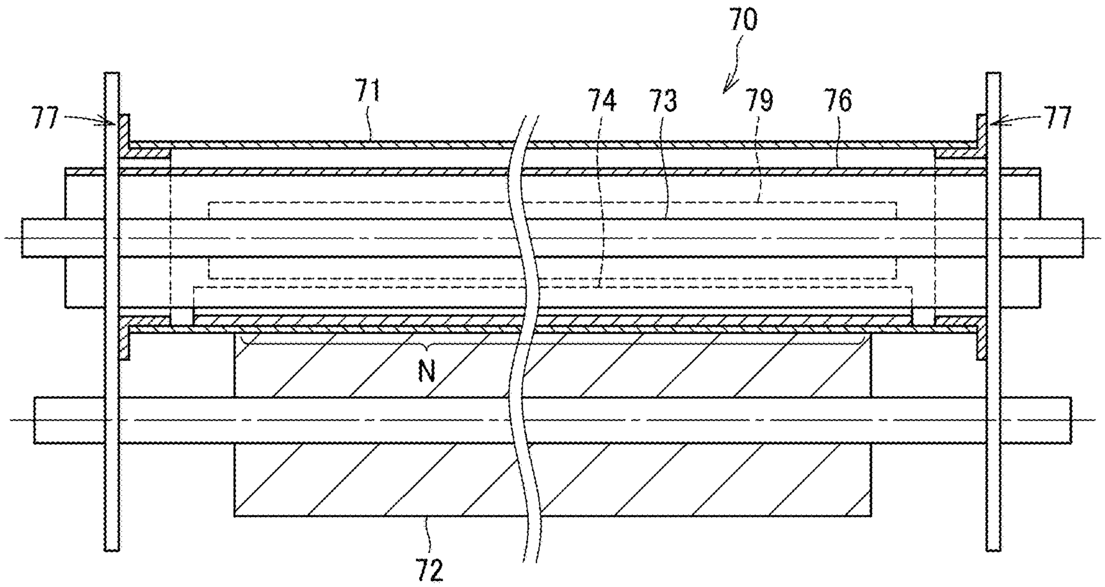
FIG. 15 is a cross-sectional view of the fixing device depicted in FIG. 14, taken along a longitudinal direction of a fixing belt incorporated in the fixing device.

As illustrated in FIGS. 14 and 15, the fixing device 70 includes a halogen heater 73 serving as a heater or a heat source, like the fixing device 20 depicted in FIGS. 2 and 3. For example, the fixing device 70 depicted in FIGS. 14 and 15 includes a fixing belt 71 serving as a first rotator, a rotator, or an endless belt, a pressure roller 72 serving as a second rotator or an opposed rotator, the halogen heater 73 serving as the heater or the heat source, a nip formation pad 74, a reflector 76, belt supports 77 serving as rotator holders depicted in FIG. 15, a temperature sensor 78 serving as a temperature detector, and guides 79.

The fixing belt 71, the pressure roller 72, the halogen heater 73, the nip formation pad 74, the reflector 76, the belt supports 77, and the temperature sensor 78 depicted in FIGS. 14 and 15 have functions that are basically equivalent to those of the fixing belt 21, the pressure roller 22, the heater 23, the nip formation pad 24, the reflector 26, the belt holders 27, and the temperature sensor 28 depicted in FIGS. 2 and 3, respectively.

The reflector 76 depicted in FIGS. 14 and 15 reflects radiant heat (e.g., infrared light) emitted from the halogen heater 73 toward the nip formation pad 74 mainly, not the fixing belt 71. The reflector 76 is U-shaped in cross section to cover an outer circumferential face of the halogen heater 73. The reflector 76 includes an inner face 76*a* that is disposed opposite the halogen heater 73 and serves as a reflection face having an enhanced reflectance. Accordingly, as the halogen heater 73 emits radiant heat, the inner face 76*a* of the reflector 76 reflects the radiant heat toward the nip formation pad 74.

Thus, the nip formation pad 74 is heated by the radiant heat emitted by the halogen heater 73 toward the nip formation pad 74 and the radiant heat reflected by the reflector 76 toward the nip formation pad 74. The nip formation pad 74 conducts heat to the fixing belt 71 at the fixing nip N. The nip formation pad 74 forms the fixing nip N. Additionally, the nip formation pad 74 serves as a thermal conductor that conducts heat to the fixing belt 71 at the fixing nip N. Hence, the nip formation pad 74 is made of a metal material having an enhanced thermal conductivity, such as copper and aluminum.

The reflector 76 also serves as a support (e.g., a stay) that supports the nip formation pad 74. The reflector 76 supports the nip formation pad 74 throughout an entire span of the fixing belt 71 in a longitudinal direction thereof, suppressing a bend of the nip formation pad 74. Accordingly, the fixing nip N, having an even length in the sheet conveyance direction DP throughout the entire span of the fixing belt 71 in the longitudinal direction thereof, is formed between the fixing belt 71 and the pressure roller 72. In order to achieve a function of the reflector 76 as the support, the reflector 76 is preferably made of a metal material having an enhanced rigidity such as SUS and SECC.

The guides 79 are disposed within a loop formed by the fixing belt 71. The guides 79 contact and guide an inner circumferential face of the fixing belt 71 that rotates. Each of the guides 79 includes a guide face 79*a* that is curved along the inner circumferential face of the fixing belt 71. As each of the guides 79 guides the fixing belt 71 along the guide face 79*a*, the fixing belt 71 rotates smoothly without substantial deformation.

As described above, the fixing device 70 applied with the technology of the present disclosure includes the nip formation pad 74, having an enhanced thermal conductivity, through which heat generated by the halogen heater 73 is conducted to the fixing belt 71, thus heating the fixing belt 71.

A description is provided of a construction of a fixing device 80 according to an embodiment of the present disclosure.

Figure 16:
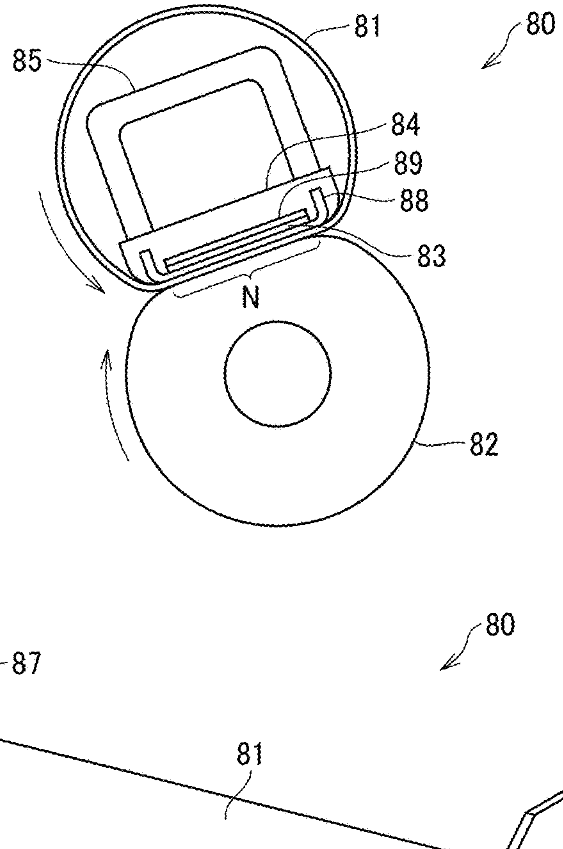
FIG. 16 is a cross-sectional view of a fixing device according to yet another embodiment of the present disclosure, that is installable in the image forming apparatus depicted in FIG. 1.

As illustrated in FIG. 16, the fixing device 80 includes a heater 83 (e.g., a ceramic heater) serving as a heat source, like the fixing device 40 depicted in FIGS. 8 and 9. For example, the fixing device 80 depicted in FIGS. 16 and 17 includes a fixing belt 81 serving as a first rotator, a rotator, or an endless belt, a pressure roller 82 serving as a second rotator or an opposed rotator, the heater 83 serving as the heat source, a holder 84 serving as a heat source holder, a stay 85 serving as a support, arcuate guides 87 serving as rotator holders depicted in FIG. 17, a thermal diffuser 88 serving as a thermal conductor and a nip formation pad, and a thermal insulation plate 89 serving as a thermal insulator.

Figure 17:
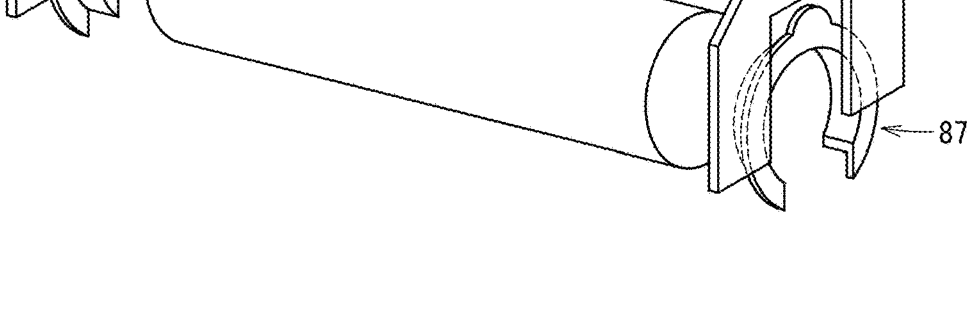
FIG. 17 is an exploded perspective view of the fixing device depicted in FIG. 16.

The fixing belt 81, the pressure roller 82, the heater 83, the holder 84, the stay 85, and the arcuate guides 87 depicted in FIGS. 16 and 17 have functions that are basically equivalent to those of the fixing belt 41, the pressure roller 42, the heater 43, the heater holder 44, the pressure stay 45, and the flanges 47 depicted in FIGS. 8 and 9, respectively. The holder 84 holds the thermal diffuser 88 and the thermal insulation plate 89 layered on the thermal diffuser 88, in addition to the heater 83.

The thermal diffuser 88 is made of a metal material such as stainless steel, an alloy of aluminum, and iron. The thermal diffuser 88 contacts an inner circumferential face of the fixing belt 81. The thermal diffuser 88 conducts heat generated by the heater 83 to the fixing belt 81. Additionally, the thermal diffuser 88 is disposed opposite the pressure roller 82 via the fixing belt 81, forming the fixing nip N between the fixing belt 81 and the pressure roller 82. Thermal grease is applied between the heater 83 and the thermal diffuser 88, improving efficiency in conduction of heat from the heater 83 to the thermal diffuser 88. In order to suppress conduction of heat from the heater 83 to the holder 84 and the stay 85, the thermal insulation plate 89 is mounted on an opposite face of the heater 83, that is opposite to a thermal diffuser opposed face of the heater 83, that is disposed opposite the thermal diffuser 88.

As the fixing belt 81 rotates, the fixing belt 81 slides over the thermal diffuser 88. Hence, the silicone oil or the silicone grease is applied between the fixing belt 81 and the thermal diffuser 88, as the lubricant that facilitates sliding of the fixing belt 81 over the thermal diffuser 88. The thermal diffuser 88 includes a slide face that contacts the fixing belt 81. The slide face includes a surface layer treated with glass coating or hard chromium plating that has low friction and abrasion resistance.

With the above-described construction of the fixing device 80 also, as the heater 83 generates heat and the temperature of the arcuate guides 87 increases, the siloxanes that are from the dodecamer to the heptadecamer and are contained in the silicone oil or the silicone grease adhered to the arcuate guides 87 may volatilize, generating the ultrafine particles. To address the circumstance, the fixing device 80 is applied with the technology of the present disclosure, suppressing generation of the ultrafine particles.

A description is provided of a construction of a fixing device 90 according to an embodiment of the present disclosure.

Figure 18:
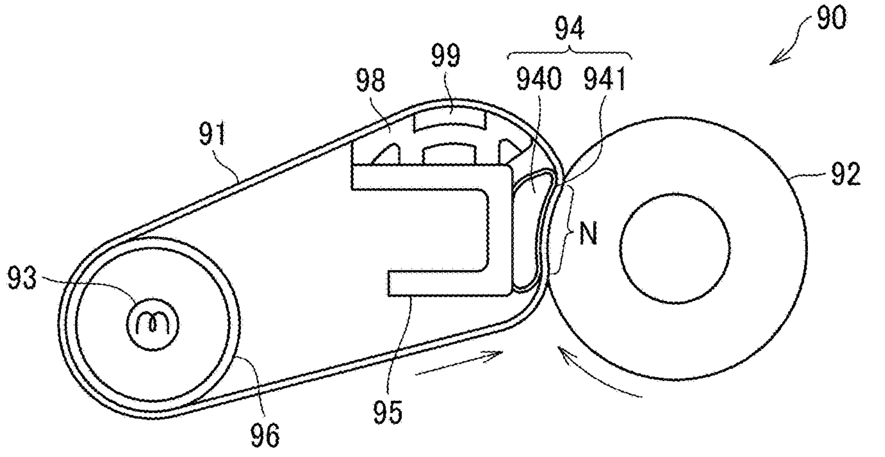
FIG. 18 is a cross-sectional view of a fixing device according to yet another embodiment of the present disclosure, that is installable in the image forming apparatus depicted in FIG. 1.
Figure 19:
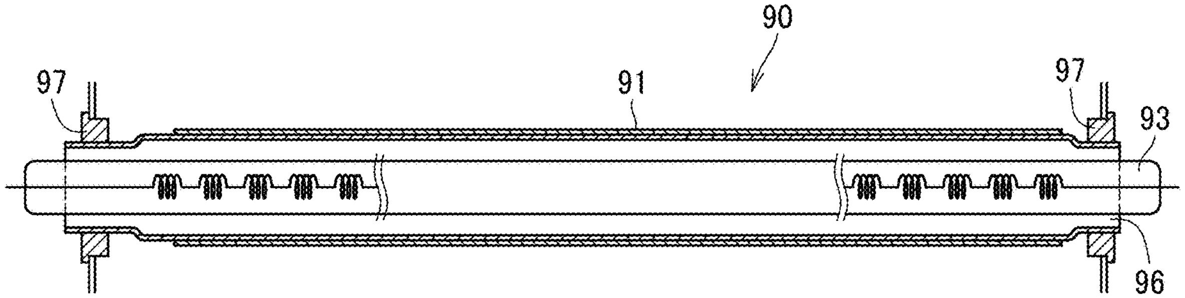
FIG. 19 is a cross-sectional view of the fixing device depicted in FIG. 18, illustrating rotator holders that hold a heating roller.

As illustrated in FIGS. 18 and 19, the fixing device 90 includes a belt 91 (e.g., an endless belt) serving as a first rotator or a rotator, a heating roller 96 serving as a heating rotator, a heater 93 serving as a heat source, a pressure roller 92 serving as a second rotator or an opposed rotator, a nip formation pad 94, a support 95, a guide 98, a lubricant applicator 99 serving as a lubricant supply, and bearings 97 serving as rotator holders depicted in FIG. 19.

As illustrated in FIG. 18, the belt 91 is looped over the heating roller 96, the nip formation pad 94, and the guide 98. As a spring or the like biases the heating roller 96 in a separation direction in which the heating roller 96 separates from the nip formation pad 94, the heating roller 96 applies predetermined tension to the belt 91. In a state in which the belt 91 is applied with the predetermined tension, as a driver drives and rotates the pressure roller 92, the pressure roller 92 drives and rotates the belt 91.

The nip formation pad 94 includes a pressure pad 940 and a slide sheet 941. The slide sheet 941 is interposed between the pressure pad 940 and an inner circumferential face of the belt 91 and has low friction. Since the support 95 supports the pressure pad 940, the pressure pad 940 receives pressure from the pressure roller 92, forming the fixing nip N between the belt 91 and the pressure roller 92.

The heater 93 is a halogen heater or the like and is disposed inside the heating roller 96. As the heater 93 generates heat, the heater 93 heats the heating roller 96 that conducts heat to the belt 91.

The lubricant applicator 99 contacts the inner circumferential face of the belt 91, supplying the lubricant that improves sliding of the belt 91 to the inner circumferential face of the belt 91. As the belt 91 rotates, the lubricant supplied to the inner circumferential face of the belt 91 is interposed between the guide 98 and the belt 91 and between the nip formation pad 94 and the belt 91, facilitating smooth rotation of the belt 91.

The bearing 97 such as a sliding bearing and a ball bearing holds the heating roller 96 such that the heating roller 96 is rotatable. The bearing 97 serving as the rotator holder is attached to each lateral end of the heating roller 96 in an axial direction thereof, that is, a longitudinal direction thereof. The bearing 97 is applied with the lubricant such as the silicone oil and the silicone grease that decreases sliding friction or rotation torque when the heating roller 96 rotates.

As the heater 93 heats the heating roller 96 and heat is conducted from the heating roller 96 to the bearings 97, the temperature of the silicone oil or the silicone grease adhered to the bearings 97 increases. Accordingly, the siloxanes that are from the dodecamer to the heptadecamer and are contained in the silicone oil or the silicone grease may volatilize, generating the ultrafine particles. To address the circumstance, the fixing device 90 depicted in FIGS. 18 and 19 is also applied with the technology of the present disclosure, decreasing the number of the ultrafine particles that generate from the silicone oil or the silicone grease, like the embodiments described above.

Figure 20:
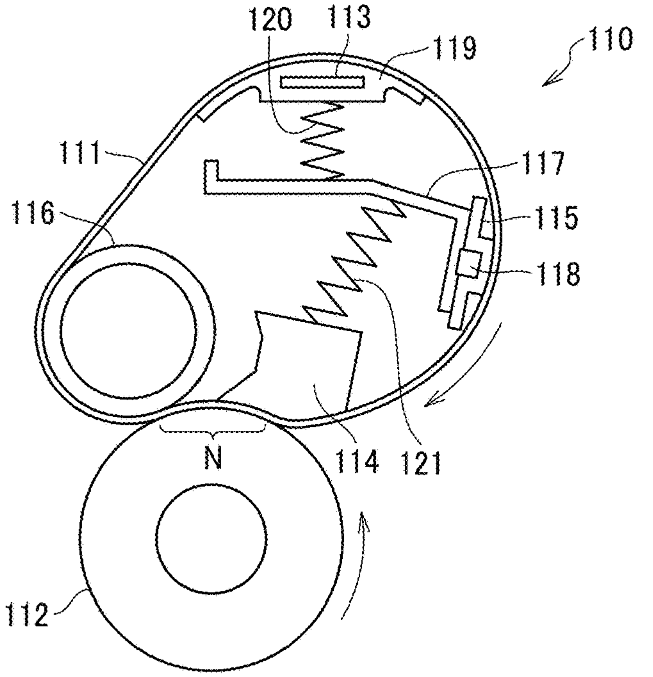
FIG. 20 is a cross-sectional view of a fixing device according to yet another embodiment of the present disclosure, that is installable in the image forming apparatus depicted in FIG. 1.
Figure 21:
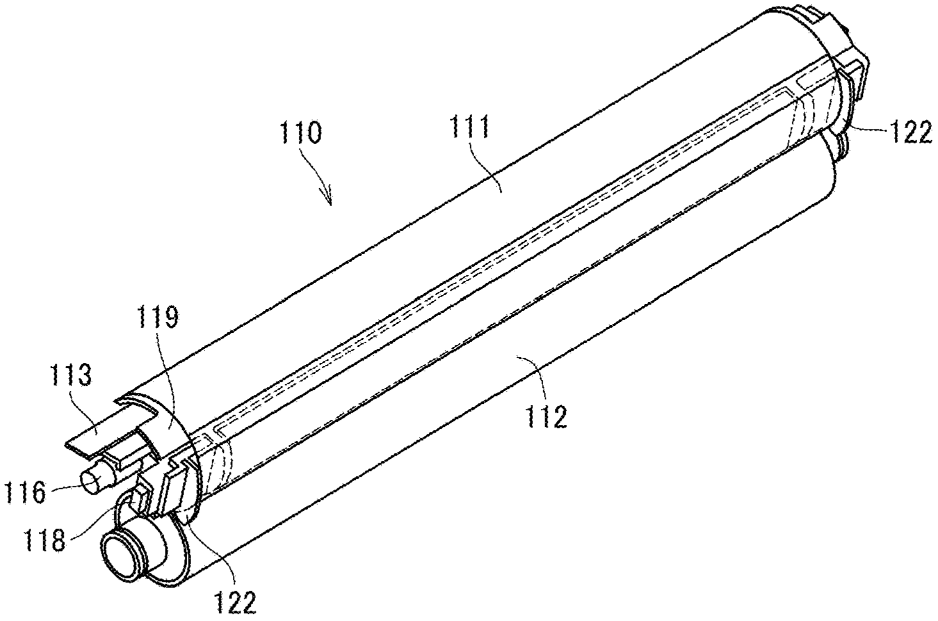
FIG. 21 is a perspective view of the fixing device depicted in FIG. 20.

The technology of the present disclosure is also applied to a fixing device 110 having a construction illustrated in FIGS. 20 and 21.

The fixing device 110 depicted in FIGS. 20 and 21 includes a fixing belt 111 serving as a first rotator, a rotator, or an endless belt, a fixing roller 116, a pressure roller 112 serving as a second rotator or an opposed rotator, a heater 113 serving as a heat source, a pressure pad 114 serving as a nip formation pad, a guide 115, a support 117, a temperature sensor 118 serving as a temperature detector, a thermal conductor 119, and belt holders 122 serving as rotator holders depicted in FIG. 21.

As illustrated in FIG. 20, the fixing belt 111 is looped over the fixing roller 116, the pressure pad 114, the guide 115, and the thermal conductor 119. As the pressure roller 112 drives and rotates the fixing belt 111, the fixing belt 111 rotates the fixing roller 116.

The heater 113 is a laminated heater or a platy heater such as a ceramic heater and is attached to the thermal conductor 119. The thermal conductor 119 is interposed between the heater 113 and the fixing belt 111 and conducts heat generated by the heater 113 to the fixing belt 111. The fixing device 110 further includes a spring 120 that is anchored to the support 117. The spring 120 biases the thermal conductor 119 against an inner circumferential face of the fixing belt 111 so that the thermal conductor 119 contacts the inner circumferential face of the fixing belt 111.

The fixing device 110 further includes another spring 121 that is anchored to the support 117. The spring 121 biases the pressure pad 114 against the inner circumferential face of the fixing belt 111 so that the pressure pad 114 contacts the inner circumferential face of the fixing belt 111. Thus, the spring 121 presses the pressure pad 114 against the pressure roller 112 via the fixing belt 111, forming the fixing nip N between the fixing belt 111 and the pressure roller 112.

The guide 115 is attached to and supported by the support 117. The temperature sensor 118 is attached to the guide 115 and detects the temperature of the fixing belt 111.

In the fixing device 110 depicted in FIGS. 20 and 21 also, the belt holders 122 hold both lateral ends of the fixing belt 111 in a longitudinal direction thereof, respectively. Hence, as the heater 113 heats the fixing belt 111, the temperature of the silicone oil or the silicone grease adhered to the belt holders 122 increases. Accordingly, the siloxanes that are from the dodecamer to the heptadecamer and are contained in the silicone oil or the silicone grease may volatilize, generating the ultrafine particles. To address the circumstance, the fixing device 110 is also applied with the technology of the present disclosure, suppressing generation of the ultrafine particles effectively, like the embodiments described above.

Application of the technology of the present disclosure is not limited to a fixing device (e.g., the fixing devices 20, 40, 50, 60, 70, 80, 90, and 110) installed in an image forming apparatus (e.g., the image forming apparatus 100) that forms an image by electrophotography. For example, the technology of the present disclosure is also applied to a heating device other than the fixing device, that is installed in an image forming apparatus employing an inkjet method. The heating device includes a dryer that dries liquid such as ink applied on a sheet.

Figure 22:
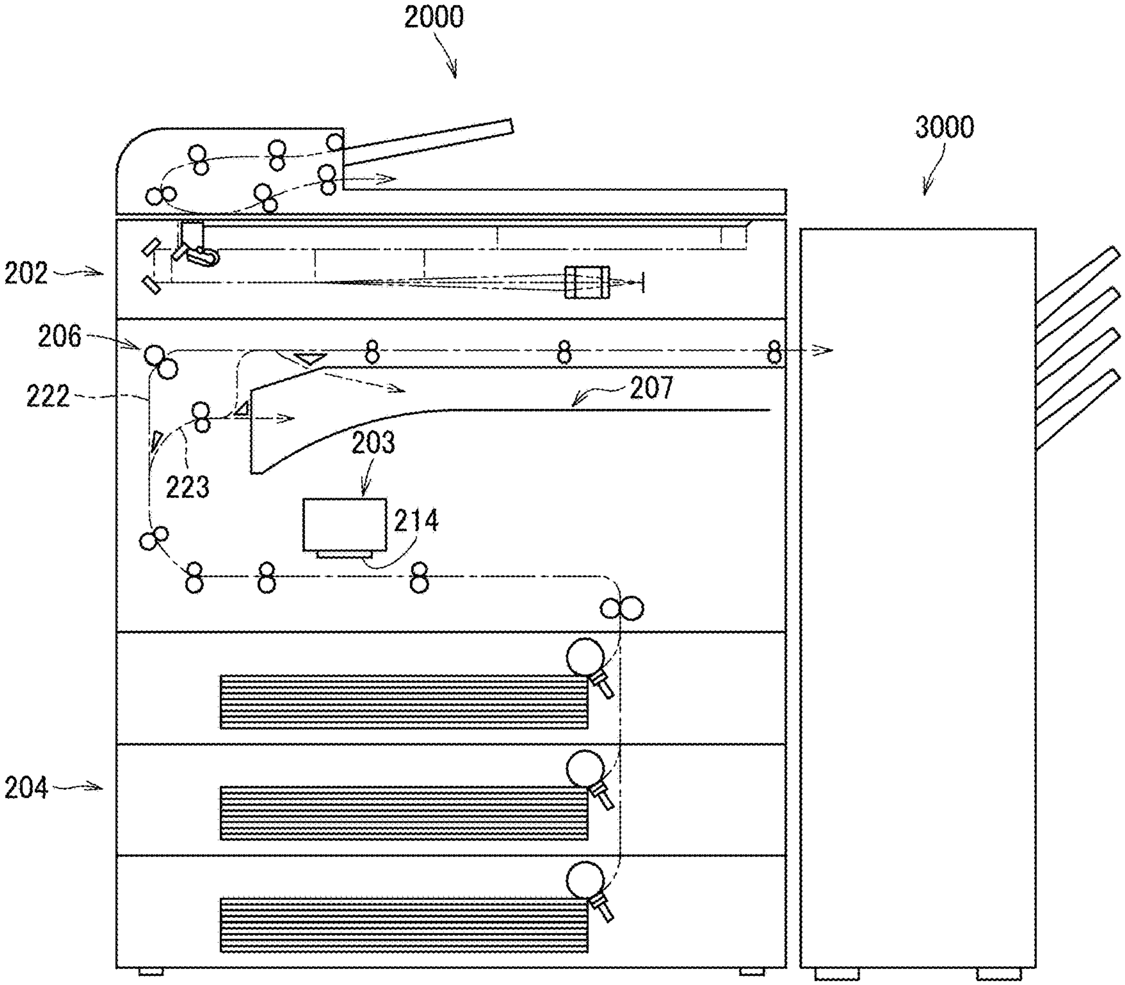
FIG. 22 is a cross-sectional view of an inkjet image forming apparatus according to another embodiment of the present disclosure, that incorporates a dryer.

FIG. 22 illustrates an inkjet image forming apparatus 2000 according to an embodiment of the present disclosure, that incorporates a dryer 206.

As illustrated in FIG. 22, the inkjet image forming apparatus 2000 includes a scanner 202, an image forming device 203, a sheet supply 204, the dryer 206, and a sheet output device 207. A sheet aligner 3000 (e.g., a finisher) is disposed beside the inkjet image forming apparatus 2000.

When the inkjet image forming apparatus 2000 receives an instruction to start printing, the sheet supply 204 supplies a sheet (e.g., paper) serving as a recording medium. When the sheet is conveyed to the image forming device 203, a liquid discharge head 214 of the image forming device 203 discharges ink onto the sheet according to image data created by the scanner 202 that reads an image on an original or image data (e.g., print data) sent from a terminal, thus forming an image on the sheet.

The sheet bearing the image is selectively guided to a conveyance path 222 provided with the dryer 206 or a conveyance path 223 not provided with the dryer 206. If the sheet is guided to the dryer 206, the dryer 206 facilitates drying of ink on the sheet. The sheet is guided to the sheet output device 207 or the sheet aligner 3000. Conversely, if the sheet is guided to the conveyance path 223 not provided with the dryer 206, the sheet is guided to the sheet output device 207 or the sheet aligner 3000 without being dried by the dryer 206. If the sheet is guided to the sheet aligner 3000, the sheet aligner 3000 aligns the sheet and places the sheet on a tray.

Figure 23:
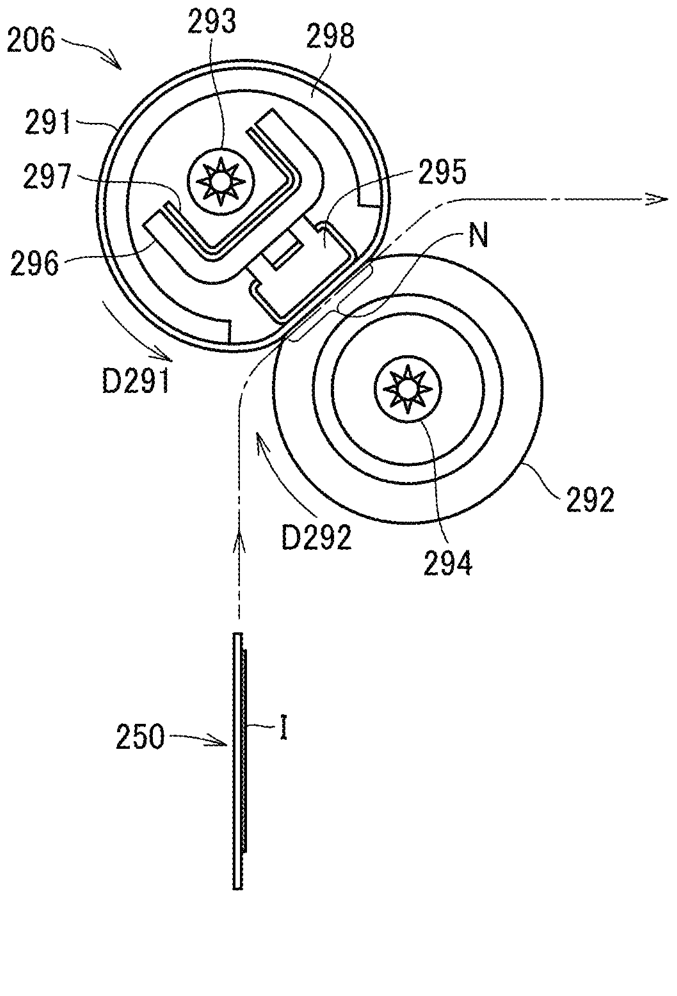
FIG. 23 is a cross-sectional view of the dryer depicted in FIG. 22.

As illustrated in FIG. 23, the dryer 206 serving as a heating device includes a heating belt 291 serving as a first rotator, a rotator, or an endless belt, a heating roller 292 serving as a second rotator or an opposed rotator, a first heater 293 serving as a heater or a heat source that heats the heating belt 291, a second heater 294 serving as a heat source that heats the heating roller 292, a nip formation pad 295, a stay 296 serving as a support, a reflector 297, and a pair of belt holders 298 serving as rotator holders that rotatably hold the heating belt 291.

The nip formation pad 295 presses against an outer circumferential face of the heating roller 292 via the heating belt 291, forming the fixing nip N between the heating belt 291 and the heating roller 292. As illustrated in FIG. 23, as a sheet 250 bearing an image, that is, ink I, is conveyed through the fixing nip N of the dryer 206, the heating belt 291 that rotates in a rotation direction D291 and the heating roller 292 that rotates in a rotation direction D292 heat the sheet 250 while conveying the sheet 250. Thus, the dryer 206 facilitates drying of the ink I on the sheet 250.

In the dryer 206 depicted in FIG. 23, the pair of belt holders 298 disposed opposite both lateral ends of the heating belt 291 in a longitudinal direction thereof, respectively, rotatably holds the heating belt 291. Hence, as the first heater 293 heats the heating belt 291 and the temperature of the belt holders 298 increases, the silicone oil or the silicone grease adhered to the belt holders 298 may generate the ultrafine particles. To address the circumstance, the dryer 206 is also applied with the technology of the present disclosure, suppressing generation of the ultrafine particles effectively.

Figure 24:
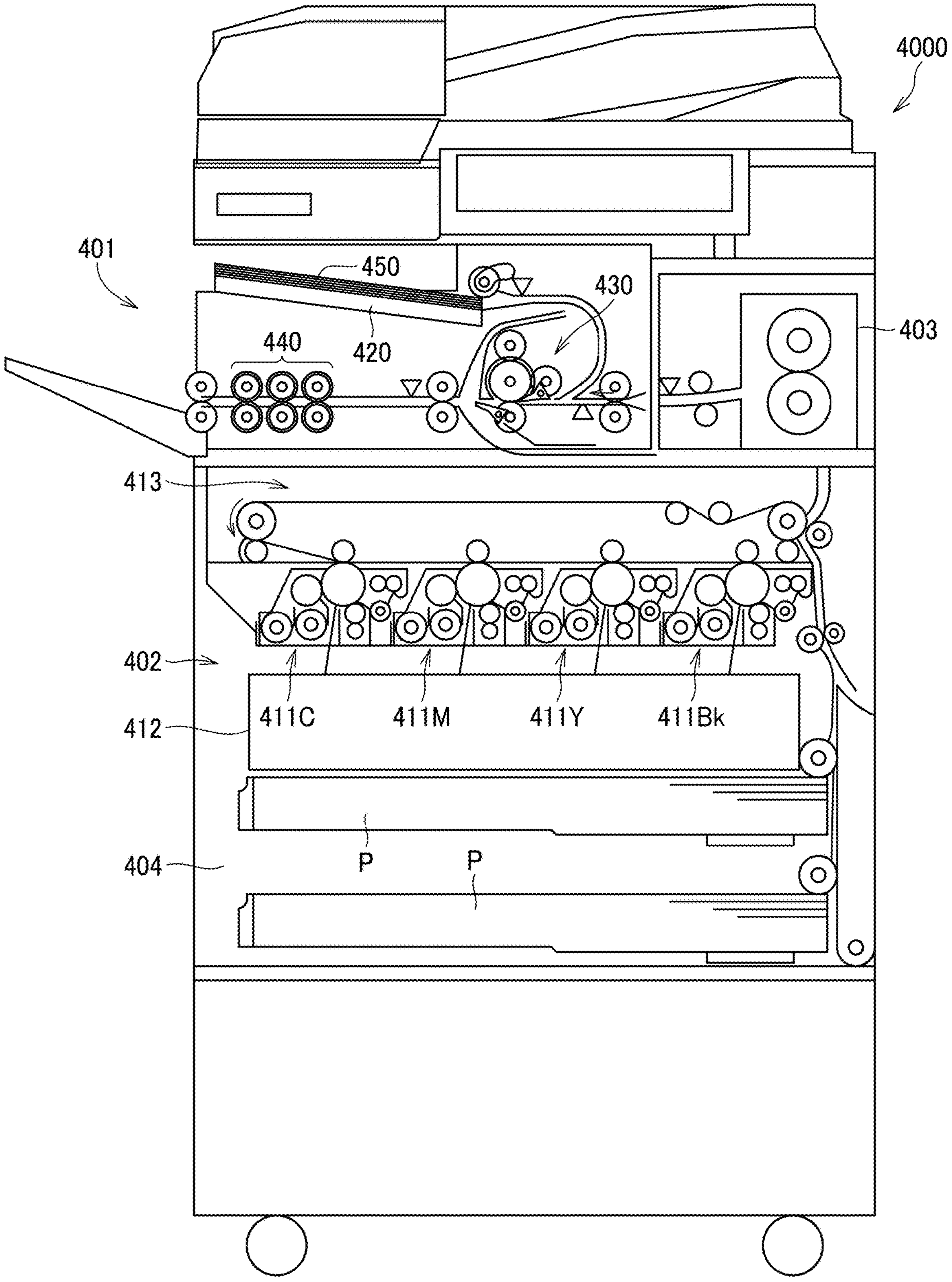
FIG. 24 is a cross-sectional view of an image forming apparatus according to yet another embodiment of the present disclosure, that incorporates a laminator.

The technology of the present disclosure is also applied to an image forming apparatus 4000 including a laminator 401 illustrated in FIG. 24.

As illustrated in FIG. 24, the image forming apparatus 4000 includes, in addition to the laminator 401, an image forming device 402 including a plurality of image forming units 411C, 411M, 411Y, and 411Bk, an exposure device 412, and a transfer device 413, a fixing device 403, and a sheet feeder 404 serving as a recording medium supply.

The laminator 401 serves as a heating device that heats and presses a sheet P inserted into and sandwiched between two sheets, thus bonding the sheets by thermocompression. For example, the laminator 401 includes a sheet supply 420, a sheet peeler 430, and thermal pressure rollers 440. The sheet supply 420 supplies sheets 450. The sheet peeler 430 peels the sheets 450 supplied from the sheet supply 420 into two sheets 450. Each of the thermal pressure rollers 440 serves as a rotator that conveys the sheet P and the sheets 450 while heating and pressing the sheet P and the sheets 450 in a state in which the sheet P is inserted into a gap between the two peeled sheets 450. The laminator 401 further includes a heat source such as a heater that heats the thermal pressure roller 440. The laminator 401 further includes a pair of bearings serving as a pair of rotator holders that rotatably holds both lateral ends of the thermal pressure roller 440 in a longitudinal direction thereof, respectively.

In the image forming apparatus 4000 depicted in FIG. 24, as the sheet feeder 404 supplies a sheet P serving as a recording medium to the image forming device 402, the image forming device 402 forms an image and transfers the image onto the sheet P supplied from the sheet feeder 404. The sheet P transferred with the image is conveyed to the fixing device 403 that fixes the image on the sheet P. Image forming operation and transfer operation of the image forming device 402 (e.g., operation of the image forming units 411C, 411M, 411Y, and 411Bk, the exposure device 412, and the transfer device 413) and fixing operation of the fixing device 403 are basically equivalent to those according to the embodiments described above. Therefore, a description of the image forming operation, the transfer operation, and the fixing operation is omitted.

The sheet P bearing the fixed image is conveyed to the laminator 401 and is inserted into the gap between the two sheets 450 that are peeled. The thermal pressure rollers 440 heat and press the sheets 450 and the sheet P sandwiched between the two sheets 450, thus bonding the sheets 450 and the sheet P by thermocompression. The sheet P bonded with the sheets 450 is ejected to an outside of the image forming apparatus 4000.

As the heat source such as the heater heats the thermal pressure roller 440, the temperature of bearings that support the thermal pressure roller 440 increases. Accordingly, the silicone oil or the silicone grease adhered to the bearings may generate the ultrafine particles. To address the circumstance, the laminator 401 incorporating the thermal pressure rollers 440 is also applied with the technology of the present disclosure, suppressing generation of the ultrafine particles effectively.

The technology of the present disclosure encompasses at least a heating device, a fixing device, and an image forming apparatus that have configurations below.

A description is provided of a first configuration of the heating device (e.g., the fixing devices 20, 40, 50, 60, 70, 80, 90, 110, and 403, the dryer 206, and the laminator 401).

The heating device includes a rotator (e.g., the fixing belts 21, 41, 51, 61, 71, 81, and 111, the belt 91, the heating belt 291, and the thermal pressure roller 440), a heater (e.g., the heaters 23, 43, 53, 63, 83, 93, and 113, the halogen heater 73, and the first heater 293), and a rotator holder (e.g., the belt holders 27, 57, 122, and 298, the flange 47, the holding frame 67, the belt support 77, the arcuate guide 87, and the bearing 97).

The rotator is rotatably held by the rotator holder. The heater heats the rotator. The rotator holder holds each lateral end of the rotator in a longitudinal direction thereof. The rotator holder is adhered with silicone oil or silicone grease. The silicone oil or the silicone grease contains siloxanes that are not smaller than a dodecamer and not greater than a heptadecamer and have a concentration not greater than 1,250 ppm.

A description is provided of a second configuration of the heating device.

With the first configuration of the heating device, the rotator holder contains glass fiber.

A description is provided of a third configuration of the heating device.

With the first configuration or the second configuration of the heating device, the rotator holder has a maximum temperature that is not lower than 200 degrees Celsius and is not higher than 240 degrees Celsius when the rotator conveys recording media continuously for 10 minutes (e.g., during continuous printing for 10 minutes).

A description is provided of a fourth configuration of the heating device.

With any one of the first configuration to the third configuration of the heating device, the silicone oil or the silicone grease contains the siloxanes that are not smaller than the dodecamer and not greater than the heptadecamer and have a concentration not greater than 500 ppm.

A description is provided of a fifth configuration of a fixing device (e.g., the fixing devices 20, 40, 50, 60, 70, 80, 90, 110, and 403).

With any one of the first configuration to the fourth configuration of the heating device, the fixing device heats a recording medium bearing an unfixed image, thus fixing the unfixed image on the recording medium.

A description is provided of a sixth configuration of the fixing device.

With the fifth configuration of the fixing device, the fixing device includes an endless belt (e.g., the fixing belts 21, 41, 51, 61, 71, 81, and 111, the belt 91, and the heating belt 291), an opposed rotator (e.g., the pressure rollers 22, 42, 62, 72, 82, 92, and 112, the pressure rotator 52, the heating roller 292, and the thermal pressure roller 440), and a nip formation pad (e.g., the nip formation pads 24, 64, 74, 94, and 295, the heaters 43 and 53, the thermal diffuser 88, and the pressure pad 114).

The endless belt serves as a rotator. The opposed rotator is disposed opposite an outer circumferential face of the endless belt. The nip formation pad is disposed opposite the opposed rotator via the endless belt to form a nip (e.g., the fixing nip N) between the endless belt and the opposed rotator.

A description is provided of a seventh configuration of an image forming apparatus (e.g., the image forming apparatuses 100 and 4000 and the inkjet image forming apparatus 2000).

The image forming apparatus includes the heating device having any one of the first configuration to the fourth configuration or the fixing device having the fifth configuration or the sixth configuration.

Accordingly, the heating device, the fixing device, and the image forming apparatus suppress generation of ultrafine particles.

According to the embodiments described above, the fixing belt 21 serves as a rotator. Alternatively, a fixing film, a fixing sleeve, or the like may be used as a rotator. Further, the pressure roller 22 serves as an opposed rotator. Alternatively, a pressure belt or the like may be used as an opposed rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator configured to rotate;

a heater configured to heat the rotator; and a rotator holder configured to hold each lateral end of the rotator in a longitudinal direction of the rotator, the rotator holder adhered with one of silicone oil and silicone grease, that contains siloxanes that are not smaller than a dodecamer and not greater than a heptadecamer and have a concentration not greater than 1,250 ppm, wherein one of another silicone oil and another silicone grease with a greater concentration than the one of silicone oil and silicone grease is adhered to an inner part of the rotator between the each lateral end of the rotator in the longitudinal direction.

2. The heating device according to claim 1, wherein the rotator holder contains glass fiber.

3. The heating device according to claim 1, wherein the rotator holder has a maximum temperature that is not lower than 200 degrees Celsius and not higher than 240 degrees Celsius when the rotator conveys recording media continuously for 10 minutes.

4. The heating device according to claim 1, wherein the concentration of the siloxanes is not greater than 500 ppm.

5. The heating device according to claim 1, wherein the rotator includes one of a belt and a roller.

6. The heating device according to claim 1, wherein the rotator holder includes one of a flange, a frame, and a bearing.

7. A fixing device comprising:

an endless belt configured to rotate;

an opposed rotator disposed opposite an outer circumferential face of the endless belt;

a heater configured to heat the endless belt; and a belt holder configured to hold each lateral end of the endless belt in a longitudinal direction of the endless belt, the belt holder adhered with one of silicone oil and silicone grease, that contains siloxanes that are not smaller than a dodecamer and not greater than a heptadecamer and have a concentration not greater than 1,250 ppm, wherein one of another silicone oil and another silicone grease with a greater concentration than the one of silicone oil and silicone grease is adhered to an inner part of the rotator between the each lateral end of the rotator in the longitudinal direction.

8. The fixing device according to claim 7, wherein the endless belt is configured to heat a recording medium bearing an unfixed image and to fix the unfixed image on the recording medium.

9. The fixing device according to claim 7, further comprising a nip formation pad disposed opposite the opposed rotator via the endless belt to form a nip between the endless belt and the opposed rotator.

10. The fixing device according to claim 7, wherein the heater is disposed opposite the opposed rotator via the endless belt to form a nip between the endless belt and the opposed rotator.

11. The fixing device according to claim 7, wherein the opposed rotator includes a roller.

12. An image forming apparatus comprising:

an image forming device configured to form an image; and a heating device configured to heat the image on a recording medium, the heating device comprising:

a rotator configured to rotate;

a heater configured to heat the rotator; and a rotator holder configured to hold each lateral end of the rotator in a longitudinal direction of the rotator, the rotator holder adhered with one of silicone oil and silicone grease, that contains siloxanes that are not smaller than a dodecamer and not greater than a heptadecamer and have a concentration not greater than 1,250 ppm, wherein one of another silicone oil and another silicone grease with a greater concentration than the one of silicone oil and silicone grease is adhered to an inner part of the rotator between the each lateral end of the rotator in the longitudinal direction.

* * * * *